United States Patent
Dulmage et al.

(10) Patent No.: US 11,112,805 B2
(45) Date of Patent: Sep. 7, 2021

(54) VEHICLE COMMUNICATION SYSTEM, CONTROL SYSTEM, AND METHOD

(71) Applicant: GE Global Sourcing LLC, Norwalk, CT (US)

(72) Inventors: Scott William Dulmage, Rockledge, FL (US); Robert Thomas Oliveira, Melbourne, FL (US); Jared Klineman Cooper, Palm Bay, FL (US)

(73) Assignee: Transporation IP Holdings, LLC, Norwalk, CT (US)

( * ) Notice: Subject to any disclaimer, the term of this patent is extended or adjusted under 35 U.S.C. 154(b) by 224 days.

(21) Appl. No.: 16/417,290

(22) Filed: May 20, 2019

(65) Prior Publication Data

US 2019/0271991 A1 Sep. 5, 2019

Related U.S. Application Data

(63) Continuation-in-part of application No. 15/236,789, filed on Aug. 15, 2016, now Pat. No. 10,338,604.

(51) Int. Cl.

| | |
|---|---|
| *G05D 1/02* | (2020.01) |
| *G05D 1/10* | (2006.01) |
| *G08G 5/00* | (2006.01) |
| *G08G 1/00* | (2006.01) |
| *B61L 3/00* | (2006.01) |
| *B61L 27/00* | (2006.01) |

(Continued)

(52) U.S. Cl.
CPC .......... *G05D 1/0289* (2013.01); *G05D 1/101* (2013.01); *G08G 1/22* (2013.01); *G08G 5/0008* (2013.01); *G08G 5/0026* (2013.01); *G08G 5/0039* (2013.01); *G08G 5/0052* (2013.01); *G08G 5/0069* (2013.01); *G08G 5/0082* (2013.01); *B61L 15/0018* (2013.01); *B61L 23/14* (2013.01); *B61L 27/0094* (2013.01)

(58) Field of Classification Search
CPC .... G05D 1/0295; G05D 1/0022; B61L 3/006; B61L 3/008; B61L 15/0081; B61L 15/0027; B61L 15/0018; B61L 27/0022
See application file for complete search history.

(56) References Cited

U.S. PATENT DOCUMENTS

| | | | | |
|---|---|---|---|---|
| 2004/0198366 A1* | 10/2004 | Crocker | ................ | H04W 76/19 455/452.1 |
| 2010/0256852 A1* | 10/2010 | Mudalige | ................. | G08G 1/22 701/24 |

(Continued)

*Primary Examiner* — Tan Q Nguyen
(74) *Attorney, Agent, or Firm* — Christopher R. Carroll; The Small Patent Law Group

(57) ABSTRACT

A vehicle control system includes a controller that detects a communication loss between a first vehicle and a second vehicle and/or a monitoring device in a vehicle system. The controller operationally restricts movement of the vehicle system based on the communication loss. The controller obtains or generates a transitional plan that designates operational settings for the first vehicle and/or the second vehicle based at least in part on a location of the first vehicle and/or the second vehicle. The controller selectively changes movement of the first vehicle and/or the second vehicle via the transitional plan to reduce a speed of the first vehicle and/or the second vehicle responsive to the communication loss being detected.

21 Claims, 10 Drawing Sheets

(51) Int. Cl.
 *B61L 15/00* (2006.01)
 *B61L 23/14* (2006.01)

(56) References Cited

U.S. PATENT DOCUMENTS

2016/0167653 A1* 6/2016 Malone ................. H04L 12/403
 701/23
2017/0324667 A1* 11/2017 Camacho ............ H04L 47/2416
2018/0136651 A1* 5/2018 Levinson ............. G05D 1/0027

* cited by examiner

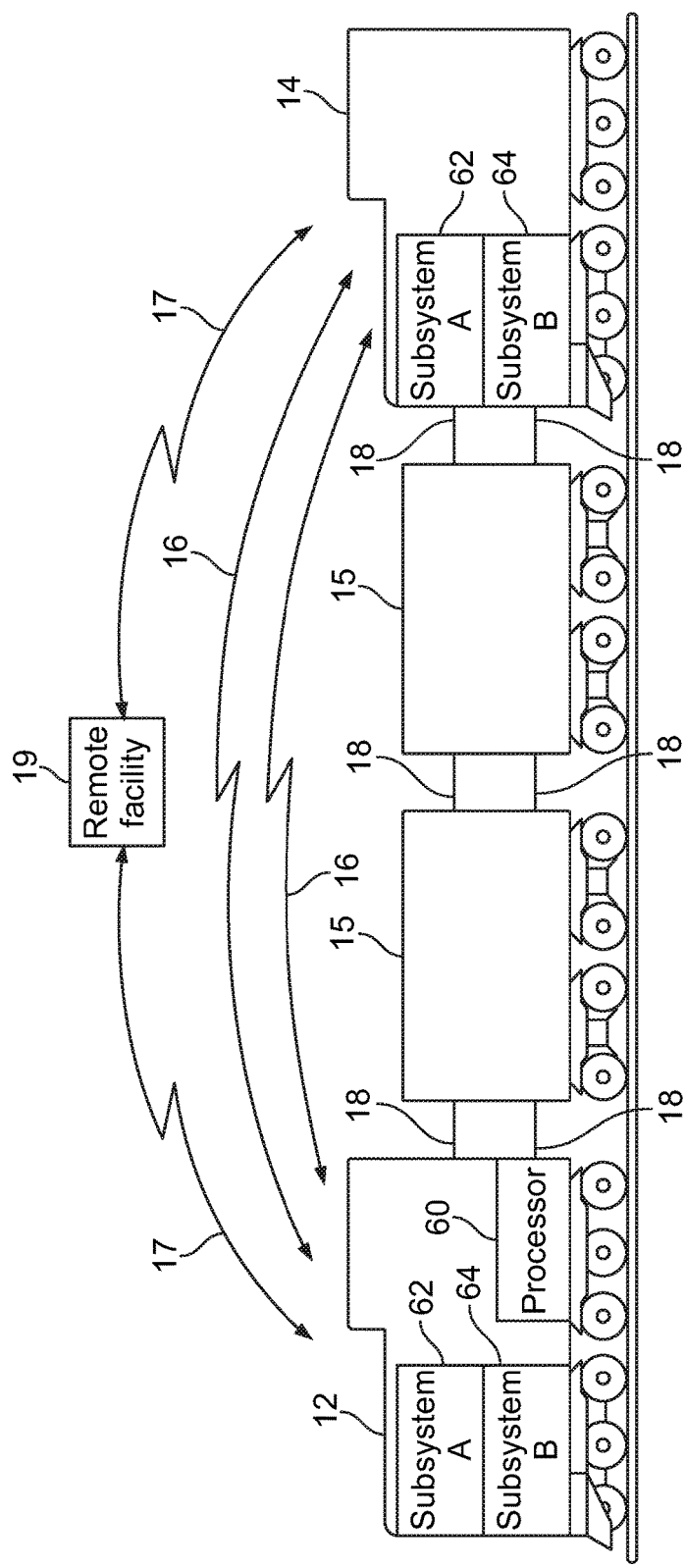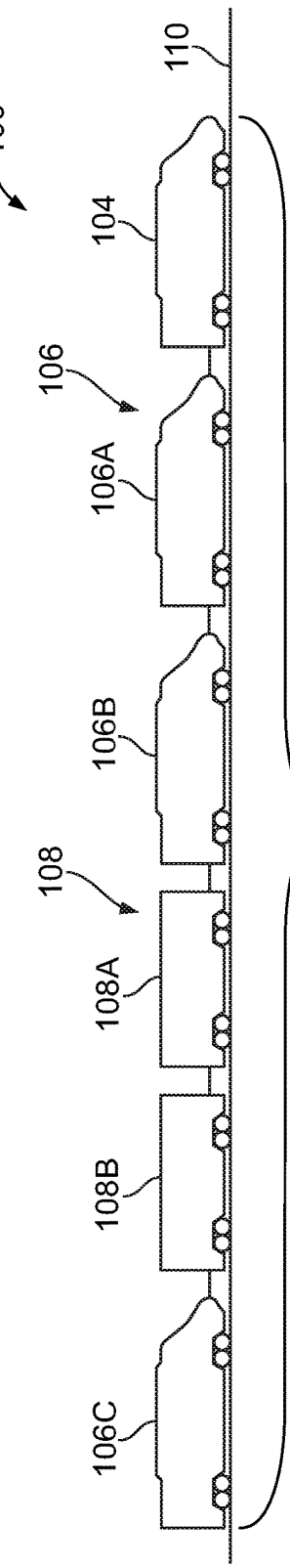

VEHICLE COMMUNICATION SYSTEM, CONTROL SYSTEM, AND METHOD

CROSS-REFERENCE TO RELATED APPLICATIONS

This application is a continuation-in-part of U.S. patent application Ser. No. 15/236,789, filed on 15 Aug. 2016, the entire disclosure of which is incorporated herein by reference.

BACKGROUND

Technical Field

Embodiments of the subject matter disclosed herein relate to communication systems of vehicles and control systems of vehicles.

Discussion of Art

Some powered systems are powered by one or more power units, such as engines. Some vehicle systems may include multiple vehicles that travel together along a route. The vehicles may be complex systems with numerous subsystems, with each subsystem being interdependent on other subsystems.

More than one propulsion-generating vehicle may be provided in a vehicle system, wherein these vehicles are referred to as a vehicle consist (e.g., the consist is a group of propulsion-generating vehicles that operate together in moving a vehicle system). To function together, the vehicles communicate with each other. The numerous subsystems on the vehicles also may communicate with like subsystems on the other vehicles. As one example, vehicles may be provided in a distributed power (DP) arrangement with one vehicle designated as a lead vehicle and other vehicles designated as remote vehicles. The lead vehicle may direct the tractive and braking efforts provided by the remote vehicles during a trip of the vehicle system.

The information that is communicated between the vehicles can include information such as, but not limited to, braking commands and other braking-related information between vehicles and/or vehicle consists within the same vehicle system. This communication may be done either using wireless communication paths and/or wired communication paths between the vehicles. A wired communication path may pass through other vehicles in the vehicle system (e.g., non-propulsion-generating vehicles, such as trailers, rail cars, or the like) that separate vehicle consists. Communication networks for specific subsystems are usually unique for these specific subsystems. Therefore, if a communication path of a specific subsystem fails, a redundancy path is not be available. Not having an available redundant path may result in the vehicle system losing performance capabilities to an extent of being non-functional.

With respect to wireless communication between the vehicles, the wireless messages can be communicated in a variety of different protocols. These different protocols can dictate the syntax, content, format, or the like, of the information included in the messages. Messages communicated in different protocols may not be understood by different systems. Systems onboard different vehicles may use different protocols and, as a result, these systems may not be able to communicate with each other.

In order to ensure that the vehicles in a vehicle system are able to communicate with each other, the vehicles may need to all be the same type of vehicle and include systems that communicate using the same protocol. Because a wide variety of vehicle types and vehicle systems exist, forming a consist with only a single type of vehicle and vehicle systems that communicate using the same protocol can significantly limit the consists that can be formed.

Communications also may occur between vehicles and other devices, such as an end-of train (EOT) or end of vehicle (EOV) device. One or more of the vehicles may periodically communicate with the EOT or EOV device that monitors one or more characteristics of the vehicle system, such as air brake pressure.

Responsive to a communication loss with the EOT or EOV device, the vehicle system may inform an onboard operator of the vehicle system. This operator may then be required to initiate a check on the communication with the EOT or EOV device and may be instructed to terminate any automatic control of the movement of the vehicle system. The operator may then reduce the moving speed of the vehicle system to or below a reduced speed limit (e.g., relative to a speed limit of the route that was applicable prior to the communication loss).

These operations by the operator require the operator to take his or her attention away from the other operations of the vehicle system. This can result in an undesirable situation, as the vehicle system may initially be traveling at a fast speed.

BRIEF DESCRIPTION

In one embodiment, a vehicle control system includes a controller configured to detect a communication loss between a first vehicle and one or more of a second vehicle or a monitoring device in a vehicle system that also includes the first vehicle. The controller is configured to operationally restrict movement of one or more vehicles in the vehicle system based on the communication loss that is determined. The controller also is configured to obtain or generate a transitional plan that designates operational settings for one or more of the first vehicle or the second vehicle based at least in part on a location of one or more of the first vehicle or the second vehicle. The controller also is configured to selectively change the movement of the one or more of the first vehicle or the second vehicle via the transitional plan to reduce a speed of the one or more of the first vehicle or the second vehicle responsive to the communication loss being detected.

In one embodiment, a vehicle control system includes a controller configured to determine a communication loss between a first vehicle and one or more of: a monitoring device and/or a second vehicle in a vehicle system that also includes the first vehicle. The controller is configured to implement an operational restriction on movement of one or more vehicles in the vehicle system based on the communication loss that is determined. The controller also is configured to obtain or generate a transitional plan that designates operational settings for one or more of the first vehicle or the second vehicle based at least in part on a location of the one or more of the first vehicle or the second vehicle. The controller also is configured to determine re-establishment of communication between the first vehicle and the one or more of the monitoring device or the second vehicle and, responsive to determining that communication is re-established, to obtain or generate a return plan that designates different operational settings of the one or more of the first vehicle or the second vehicle to remove the operational restriction of the one or more of the first vehicle or the second vehicle.

In one embodiment, a vehicle control system includes a controller configured to determine a decrease in communication quality between a first vehicle and one or more of: a monitoring device and/or a second vehicle in a vehicle system that also includes the first vehicle. The controller is configured to implement an operational restriction on movement of one or more vehicles in the vehicle system based on the communication quality being less than a threshold quality. The controller is configured to obtain or generate a transitional plan that designates operational settings for one or more of the first vehicle or the second vehicle based at least in part on a location of the one or more of the first vehicle or the second vehicle. The controller also is configured to determine an increase in the communication quality above the threshold quality and, responsive to the communication quality increasing to or above the threshold quality, the controller is configured to obtain or generate a return plan that designates different operational settings of the one or more of the first vehicle or the second vehicle to remove the operational restriction of the one or more of the first vehicle or the second vehicle.

In an embodiment, a system (e.g., a vehicle control system) includes a controller that is configured to communicate (via a first communication path) between a first vehicle and a second vehicle and/or a monitoring device in a vehicle system that also includes the first vehicle. The controller is also configured to determine a communication loss via the first communication path and, responsive to determining the communication loss, the controller is configured to switch to communicating via a different, second communication path between the first vehicle and the second vehicle and/or the monitoring device. The controller is also configured to determine an operational restriction on movement of the vehicle system based on the communication loss that is determined, and to obtain a transitional plan that designates operational settings of the vehicle system at one or more different locations along a route being traveled by the vehicle system, different distances along the route being traveled by the vehicle system, or different times. The controller is configured to automatically change the movement of the vehicle system according to the operational settings designated by the transitional plan to reduce the movement of the vehicle system to or below the operational restriction determined by the controller responsive to the communication loss being detected.

BRIEF DESCRIPTION OF THE DRAWINGS

The subject matter described herein will be better understood from reading the following description of non-limiting embodiments, with reference to the attached drawings, wherein below:

FIG. 3 depicts a block diagram of a system for ensuring communication paths exist when a primary communication path is inoperable, for example on a vehicle system FIG. 4 illustrates one embodiment of a communication system of a vehicle consist or vehicle system;

DETAILED DESCRIPTION

Figure 1:
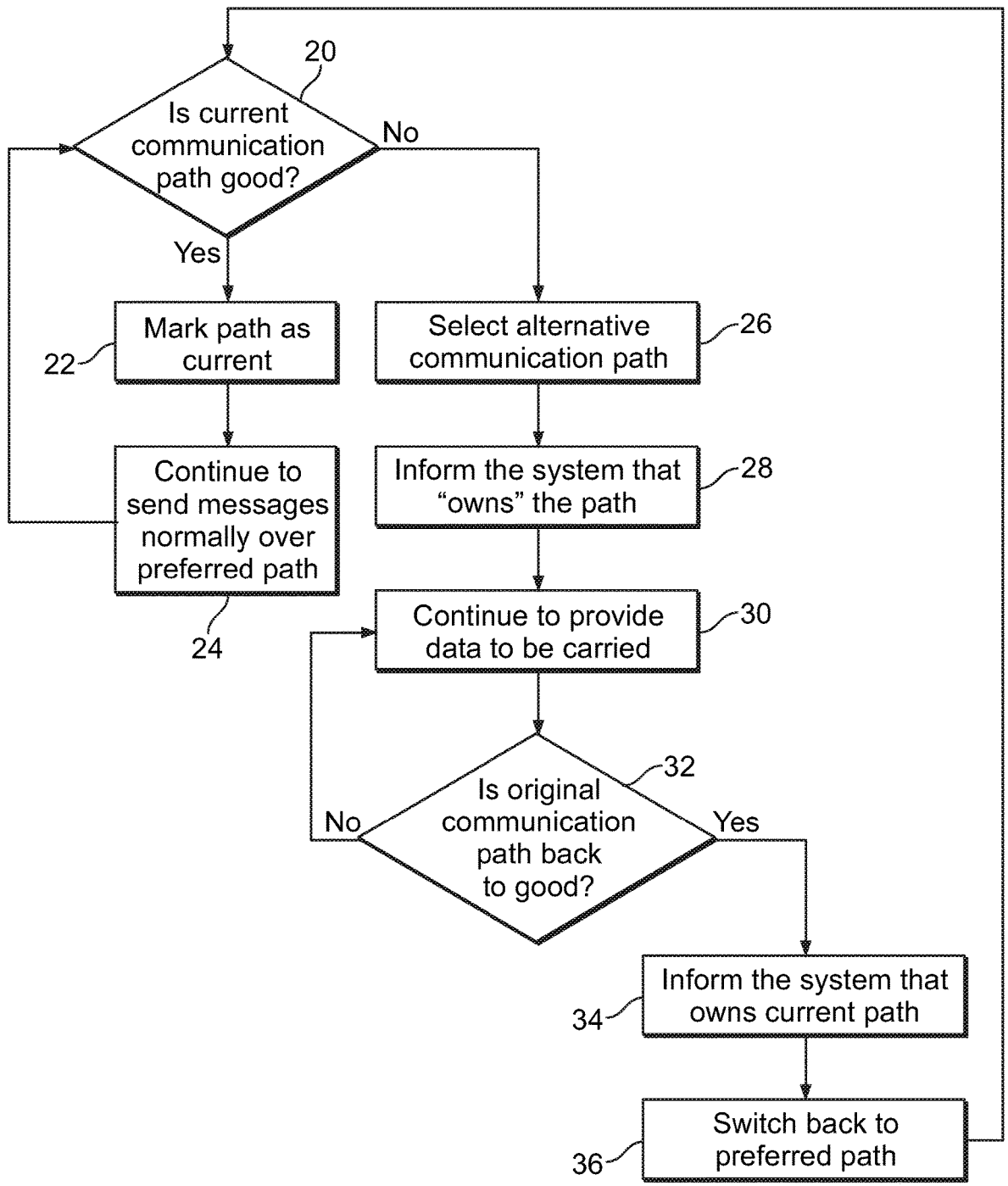
FIG. 1 depicts a flowchart illustrating one embodiment for ensuring communication paths exist when a primary communication path is inoperable

Embodiments of the subject matter disclosed herein relate to communication systems of vehicles, control systems of vehicles, and associated methods of communication and vehicle control.

Though some embodiments of the inventive subject matter are described with respect to rail vehicles, or railway transportation systems, embodiments of the inventive subject matter are also applicable for use with other powered systems, such as but not limited to automobiles, marine vessels, stationary units, off-highway vehicles, aircraft (e.g., manned aircraft and/or unmanned aircraft), and other vehicles, such as agricultural vehicles, each which may use at least one engine and where at least two of these powered systems are connected, or coupled together, either directly or through an intermediate vehicle or other unit, collectively working together to accomplish a specified mission. Toward this end, when discussing a specified mission, this includes a task or requirement to be performed by the powered system. Therefore, with respect to vehicle applications, this may refer to the movement of the collective vehicle system from a present location to a destination. In the case of stationary applications, such as but not limited to a stationary power generating station or network of power generating stations, a specified mission may refer to an amount of wattage (e.g., MW/hr) or other parameter or requirement to be satisfied by the powered system.

Although diesel powered systems are readily recognized when discussing certain types of vehicles, embodiments of the inventive subject matter described herein also may be utilized with non-diesel powered systems, such as but not limited to gasoline powered systems, natural gas powered systems, bio-diesel powered systems, etc. Furthermore, the individual powered system may include multiple engines, other power sources, and/or additional power sources, such as, but not limited to, battery sources, voltage sources (such as but not limited to capacitors), chemical sources, pressure based sources (such as but not limited to spring and/or hydraulic expansion), electrical current sources (such as but not limited to inductors), inertial sources (such as but not limited to flywheel devices), gravitational-based power sources, and/or thermal-based power sources.

Some embodiments of the inventive subject matter provide a system, method, and/or computer implemented method, such as a computer software code or computer readable media, for ensuring at least one auxiliary communication path exists when a primary communication path is inoperable, or unavailable. With respect to vehicles, some embodiments of the inventive subject matter also are operable when the vehicle consist is in DP operations.

A vehicle consist may be described as having one or more vehicles in succession, connected together so as to provide motoring and/or braking capability. The propulsion-generating vehicles in a consist can be connected together where no other vehicles (e.g., non-propulsion-generating vehicles) are between the propulsion-generating vehicles. A vehicle system can have more than one vehicle consist in the composition of the vehicle system. Specifically, there can be a lead consist and one or more remote consists, such as midway in the line of vehicles and another remote consist at the end of the vehicle system. One or more vehicle consists may have a first propulsion-generating vehicle and trail (or remote) propulsion-generating vehicle(s). Though a first propulsion-generating vehicle is usually viewed as the lead propulsion-generating vehicle, the first propulsion-generating vehicle in a multiple propulsion-generating vehicle consist may be physically located in a physically trailing position. Though a vehicle consist is usually viewed as involving successive propulsion-generating vehicle, a consist group of propulsion-generating vehicle may also be recognized as a vehicle consist even when one or more non-propulsion-generating vehicles separate the propulsion-generating vehicle, such as when the vehicle consist is configured for DP operation, with throttle and braking commands are relayed from the lead propulsion-generating vehicle to the remote propulsion-generating vehicles by wireless and/or wired connections. Toward this end, a vehicle consist should not be considered a limiting factor when discussing multiple propulsion-generating vehicles within the same vehicle system.

As disclosed herein, the vehicle consist, vehicle system, or vehicle may apply when referring to other types of powered systems. Suitable powered systems may include mobile platforms and stationary equipment. Suitable mobile platforms may include automobiles, marine vessels, off-highway vehicles, and agricultural vehicles. Stationary equipment may include a power generator or power plant. These may operate together so as to provide motoring, power generation, and/or braking capability. Vehicles may be mechanically coupled with each other in one embodiment. Vehicles may not be mechanically coupled in other embodiments, but may be logically coupled by the vehicles communicating with each other to coordinate their movements to travel as a vehicle system, consist or swarm (collectively "consist"). Sub-consists may exist as well. For example, the powered system may have more than one power generating unit. For example, a power plant may have more than one diesel electric power unit where optimization may be at the sub-consist level. Likewise, a vehicle may have more than one diesel power unit.

An apparatus, such as a data processing system, including a CPU, memory, I/O, program storage, a connecting bus, and other appropriate components, could be programmed or otherwise designed to facilitate the practice of the method of the inventive subject matter. Such a system would include appropriate programs for executing the methods of the inventive subject matter.

Also, an article of manufacture, such as a pre-recorded disk, computer readable media, or other similar computer program product, for use with a data processing system, could include a storage medium and program means recorded thereon for directing the data processing system to facilitate the practice of the methods of the inventive subject matter. Such apparatus and articles of manufacture also fall within the spirit and scope of the inventive subject matter.

A technical effect described herein ensures at least one communication path exists even when a primary communication path is impaired, inoperable or unavailable. To facilitate an understanding of the embodiments of the inventive subject matter, it is described hereinafter with reference to specific implementations thereof. Some embodiments of the inventive subject matter may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that perform particular tasks or implement particular abstract data types. For example, the software programs that underlie some embodiments of the inventive subject matter can be coded in different programming languages, for use with different devices, or platforms.

Moreover, some embodiments of the inventive subject matter may be practiced with other computer system configurations, including hand-held devices, multiprocessor systems, microprocessor-based or programmable consumer electronics, minicomputers, mainframe computers, and the like. Some embodiments of the inventive subject matter may also be practiced in distributed computing environments where tasks are performed by remote processing devices that are linked through at least one communications network. In a distributed computing environment, program modules may be located in both local and remote computer storage media including memory storage devices.

Referring now to the drawings, embodiments of the inventive subject matter will be described. Embodiments of the inventive subject matter can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the inventive subject matter are discussed below.

FIG. 1 depicts a flowchart illustrating one embodiment for ensuring communication paths exist when a primary communication path is inoperable. A decision gate, at 20, is provided to determine whether a current, or primary, communication path is working for a first subsystem. (The primary or current path is also arbitrarily referred to as the "preferred" path in FIG. 1.) If the path is working, the path is marked as current, at 22, and communications, or messages, are sent as they would normally be sent through the current, or primary, communication path, at 24. When the primary communication path ceases to be operable, an alternative, or auxiliary communication path is selected, at 26. A second subsystem that the auxiliary communication path is associated with (e.g., the second subsystem "owns" the auxiliary communication path) is notified that its communication path is needed to provide a communication path for another subsystem, at 28, more specifically the first subsystem. Messages, or communications, are carried for the first subsystem on the auxiliary communication path, at 30. A decision gate, at 32, is provided to determine when the primary communication path is again available. As long as the primary communication path is not available, the first subsystem may continue to use the auxiliary communication path. When the primary communication path is again available, the second subsystem is notified that use of its communication path, at 34, which is the auxiliary communication path, is no longer required and a switch, or transition, is made back to the primary communication path, at 36.

As illustrated above, at least one alternate or auxiliary communication path to route data through pre-existing communication paths is provided. This is accomplished using an algorithm, storable decision processes, and/or communication protocol to ensure that data required for the first subsystem reaches its destination. In one embodiment, when an auxiliary communication path is used, reduced information, or data, may be transmitted where reduced functionality may result. For example, suppose that the first subsystem has a capability to communicate operational conditions as well as locator or positioning information, or data, through the vehicle system. For the first subsystem and similar subsystems in communication with the first subsystem, however, the only required information is associated with the operational conditions. Instead of possibly limiting the full functionality of the auxiliary communication path by trying to communicate information that exceeds a bandwidth of the auxiliary communication path, which is primarily responsible for the communication requirements of the second subsystem, the locator information may not be transmitted. Therefore, for messages that are being transmitted over an auxiliary communication path, the message may be restructured to be in compliance with the bandwidth of the auxiliary communication path.

Some embodiments of the inventive subject matter also may be utilized even where subsystems may already have multiple communication paths available to transfer data. For example, with respect to a train, a dynamic brake modem may collect information on a vehicle network, such as a trainline network. The information is then forwarded to a DP box, which in turn delivers the information, usually over a radio frequency (RF) link, to a lead vehicle. The lead vehicle then forwards the information, such as via a RS422 link, to an onboard control system, which then returns the information to the dynamic brake modem via an Ethernet communication path. Therefore, some embodiments of the inventive subject matter may be used to select an auxiliary communication path should any of these communication paths fail or become inoperable.

Several terms are used herein to describe when a communication path is unable to provide communication therethrough. Such terms include, but are not limited to, fail, inoperable, unavailable, communication loss, etc. These terms are not limiting since they may pertain to not having sufficient bandwidth to effect communication, improper message format, a hardware failure, and/or a software failure. Similarly, several terms are used herein to describe when the communication path is able to provide communication therethrough. Such terms include, but are not limited to, work, operable, available, and the like.

Figure 2:
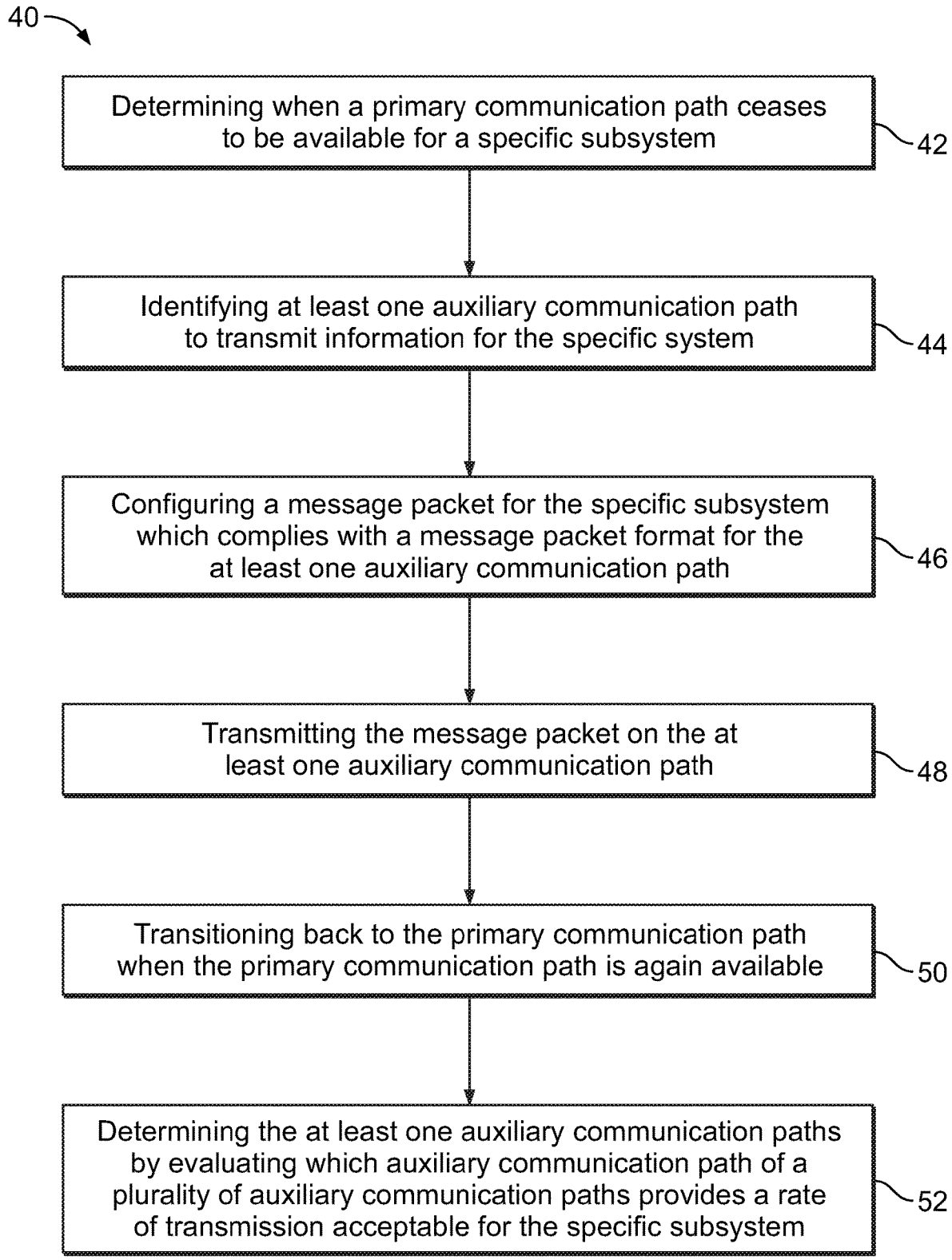
FIG. 2 depicts another flowchart illustrating one embodiment of a method for ensuring communication paths exist when a primary communication path is inoperable

FIG. 2 depicts another flowchart illustrating one embodiment of a method for ensuring communication paths exist when a primary communication path is inoperable. As illustrated in the flowchart 40, a determination is made when a primary communication path for a specific subsystem ceases to be available, at 42. At least one auxiliary communication path to transmit information for the specific subsystem is identified, at 44. The message for the specific subsystem (e.g., a message packet) is configured to comply with a message format for the auxiliary communication path, at 46. Configuring the message may include, but is not limited to restructuring the message to be compliant to a bandwidth of the auxiliary communication path, and/or removing non-vital information from the message so that the message is compliant with the message format for the at least one auxiliary communication path. "Non-vital information means information that is not critical to operating the powered system. The message is transmitted on the auxiliary communication path, at 48. When the primary communication path is again available, the communication is transitioned back to the primary communication path, at 50. Before selecting an auxiliary communication path, a determination may be made whether a rate of transmission over the auxiliary communication path is acceptable for the specific subsystem, at 52. The method illustrated in flowchart 40 may be implemented in a computer software code that is storable on a computer readable media and that is operable with a processor 60, as is disclosed in FIG. 3.

FIG. 3 depicts a block diagram of a system for ensuring communication paths exist when a primary communication path is inoperable, for example on a vehicle system. While the vehicle system is illustrated as a rail vehicle system, the vehicle system may represent another grouping of vehicles that travel together (where the vehicles may or may not be mechanically linked with each other). A plurality of communication paths 16, 18 is available on the vehicle system. Some may be wired paths 18 while others may be wireless paths 16. To reach a remote consist 14, the wired paths 18 pass through non-propulsion-generating vehicles 15 separating the remote consist 12 from the next proximate consist 14. One or more processors 60 are aboard the vehicle system and configured to determine whether a primary communication path is operable for a specific subsystem "A" 62. The processors 60 are further configured to identify an auxiliary communication path, typically associated with another subsystem "B" 64, configure a message meant to be delivered with the primary communication path for delivery with the auxiliary communication path when the primary communication path is not operable, and/or transmit a message originally configured for the primary communication path, with the auxiliary communication path. The processors 60 are further configured to determine when the primary communication path is again operable, and to transition communication back to the primary communication path. When a plurality of auxiliary communication paths is possible, the processors 60 are further configured to determine or selected an optimum auxiliary communication path by evaluating which of the auxiliary communication paths provide a rate of transmission acceptable for the specific subsystem, or whether the message is complaint with a bandwidth of the auxiliary communication path.

As further illustrated in FIG. 3, the auxiliary communication path may be a communication path that communicates to a remote entity, such as but not limited to a remote facility 19, a depot, a wayside device, or other system or component disposed off-board the vehicle system. This remote communication path 17 may be in communication with a communication path on the vehicle system and/or with the specific subsystem 62, and may be used as the auxiliary communication path to relay a message from one part of the vehicle system, such as the lead consist 12 to another part of the vehicle system, such as the remote consist 14.

Examples of communication paths on a vehicle system that may be either the primary communication path or result in being used as an auxiliary communication path include, but are not limited to, a vibration based communication path, an audio communication path, an infrared communication path, a light based communication path, an ultraviolet communication path, a thermal communication path, a wireless radio frequency communication path, a Ethernet communication path, a RS232 communication path, a DP communication path (such as but not limited to a Locotrol® DP communication path), a wired electronically controlled pneumatics communication path, a wireless electronically controlled pneumatics communication path, a dynamic brake modem communication path, a Very High Frequency (VHF) communication path, an Ultra High Frequency (UHF) communication path, and an 802.11 communication path. Various operating modes may be used including, but not limited to, point to point, synchronous and asynchronous, circuit switched and cellular configurations. The format of the message may be unique to the communication path. For example, message packets may be used when the communication path requires such a messaging format. The subsystems can use these alternate equipment and networks as a direct or relayed path for intrasystem communications.

Furthermore, examples of the specific subsystem, first subsystem, and second subsystem include, but are not limited to, a brake control system, a head-of-train (or vehicle system) device, an end-of-train (or vehicle system) device, a DP device, and a vocal communication device.

As one example, there may exist an electronically controlled pneumatics (ECP) network, or braking system, which is a wired network, that provides brake commands. A probable failure mode for wired ECP braking systems is a connector failure mid-train, disconnecting the rear half of the vehicle system. If this network were to fail in the middle of the vehicle system, a DP wireless RF network may be used to transfer information through an RF route/channel of the RF network. Using the RF route, the information can be forwarded to a remote vehicle, and then to the onboard ECP equipment on the remote vehicle, which could then command the rear portion of the ECP vehicle system. In this case, the remote vehicle becomes a mirror to the master node on the ECP network, and the DP system on the remote vehicle replicates command and control from the lead vehicle to the braking system on the rear segment of the vehicle system. A supplemental ECP power supply on the remote vehicle is enabled, and the ECP braking system of the vehicle system functions as if there was no failure. This avoids operating the vehicle system in a degraded mode (such as at lower speed), or stopping and awaiting repair. This example enables a more reliable use of vehicles equipped with ECP-only braking systems, rather than a more expensive dual mode system that operates with ECP or conventional air pressure reduction braking control.

Communication networks are not limited to those available onboard the vehicle system. In another embodiment, if a network of the vehicle system had an ECP network and a wireless ECP system, if the wired ECP system fails, the information may be routed over the ECP network to reach the final or addressed destination of the information. If a vehicle with an ECP network detects a communication loss with another vehicle, the vehicle detecting the loss could send a wireless message over the wireless ECP network that would notify other vehicles about the communication loss, and the other vehicles could forward the messages through available networks.

If a remote controlled consist of vehicles has experienced an RF communication loss, and a path exists off-board, for example a path over an 802.11 network or other wireless local area network, both the lead consist and the remote consist could connect to the 802.11 network to transition data to a wayside communications path to route the data. Rights-of-way devices can have a plethora of other communications systems that can provide alternative paths to be used, including but not limited to, licensed and un-licensed spread spectrum networks for signaling systems and communications systems, and dedicated UHF and VHF channels allocated for vehicular use.

In another example, if the dynamic brake modem, which communicates braking and motoring information to a lead vehicle, is experiencing a slow communication path, and if a communications path (such as through an 802.11 network) exists amongst the vehicles within the consist that provides a higher bandwidth, the dynamic brake modem could utilize the high speed path instead of its primary communication path to transfer the information of the modem, or data.

One or more embodiments of the subject matter described herein provide for methods and systems for communicating with propulsion-generating vehicles in a vehicle consist. Messages may be communicated between vehicles in the vehicle consists in order to remotely control operations of the vehicles. For example, a lead vehicle in a vehicle consist can remotely control other vehicles (e.g., remote vehicles) by wirelessly transmitting or broadcasting command messages to the remote vehicles. Similarly, one or more of the remote vehicles can wirelessly communicate messages (e.g., reply messages) back to the lead vehicle.

Onboard a vehicle that receives a message, one or more components of the communication system described herein can examine the received message and determine a protocol of the message. The protocol of a message can be a format of the message. A "format" of data or a message can represent the syntax in which the data or message is recorded, read, and/or communicated. For example, the format of a communication protocol may be based on a syntax of the protocol, such as one or more rules that define how various combinations of symbols, alphanumeric text, binary bits (e.g., 0's and 1's), and the like, are combined and used to represent and communicate data between a transmitter and a recipient that are communicating using the protocol.

A communication or messaging protocol may be an open format or a closed format. An open format includes a format that can be read (e.g., received and able to be used to perform one or more functions) by a plurality of different systems provided by different manufacturers or suppliers and/or that use different communication protocols to communicate and process data. Data communicated in an open format may be implemented (e.g., read, communicated, saved, used to perform a function, and the like) by both proprietary software or modules and open (e.g., open source) software or modules. An open format can be a format whose rules of syntax are publicly available, or at least provided by an entity that controls or owns the open format to one or more other entities. In one embodiment, an open format represents a format of data that is defined by one or more industry or standards organization for a variety of different entities (e.g., different persons, corporations, or the like) to use to communicate the data. Alternatively, an open format includes a format that is able to be used (e.g., to read and communicate data) by a recipient of the data that is different from the transmitter of the data. In another embodiment, an open format may include a format that is based on an open source format of communicating the data.

A closed format can include a format that may not be used (e.g., to read or communicate data) by other entities unless the other entities are granted access to details regarding the rules, syntax, and the like, of the format. For example, a closed format may be a proprietary format of a first entity that cannot be used by other entities without the first entity providing the rules and syntax of the format to the other entities. Data or messages communicated in a closed format may be unable to be implemented by proprietary software or modules that use a different format and/or open (e.g., open source) software or modules that use an open format. A closed format can be a format whose rules of syntax are not publicly available.

If the protocol of the received message differs from a message protocol used in the vehicle that receives the message, then the vehicle may modify the protocol of the received message. In one aspect, the protocol of the message can be converted into another protocol by changing a syntax of a set of bits of the data included in the message. As another example of protocol conversion, one or more subsets of bits of the data in the message can be unpacked or extracted for inclusion into a different, second message that is in another protocol. The protocol of a message can be changed by converting the data in the message by normalizing values of the data. The above examples are not all inclusive as additional conversion mechanisms may be used to change the protocol of a message. The protocol may be changed to a protocol that is used by the vehicle that receives the message. Changing the protocol of the message can form a new message. For example, a first message may be communicated in a first protocol, and upon receipt and modification of the first protocol of the first message into a different, second protocol, a different, second message may be formed.

The message having the changed protocol may then be communicated to a system onboard the vehicle that received the message. For example, the message with the converted protocol may then be communicated to control system (also referred to as a control unit) of the vehicle in order to control movement of the vehicle. Optionally, systems other than vehicles may receive messages, convert protocols of the messages, and use the messages in the converted protocol.

Vehicles may use different protocols when the vehicles are different types of vehicles. For example, propulsion-generating vehicles manufactured by different companies may use different protocols for messaging between the vehicles. As another example, vehicles that operate in different manners may use different protocols in messaging. A vehicle that consumes diesel fuel may use a different messaging protocol than the vehicle that is powered by electric current received from a source such as an overhead catenary, an electrified wire or other conductive body, and onboard battery, or the like. Prior to the subject matter described herein, these different types of vehicles may not have been able to be included in the same vehicle consist to communicate with each other and concurrently operate to move the vehicle consist.

The messages described herein may be communicated to and/or from locations that are off-board a vehicle. For example, a stationary facility, such as a dispatch facility, a maintenance facility, a repair facility, a vehicle yard, or the like, may communicate wireless messages to one or more vehicles in the vehicle consist that are in different protocols that are used by the vehicles. Optionally, the vehicles may communicate messages to the off-board facilities that are in different protocols used by the off-board facility. The vehicles and/or off-board facility can convert the protocols of messages received in different protocols that are used by the vehicles and/or off-board facilities.

In one aspect, changing the protocol of the message may change the data content of the message. For example, numerical values, settings, or the like, that are included in the wireless message may be changed upon converting the protocol of the message. With respect to vehicle consists, a lead vehicle may communicate a message that directs a remote vehicle to change a throttle setting of the remote vehicle to a setting designated by the message. Upon conversion of the protocol of the message, this throttle setting value communicated in the message in the previous protocol may be changed to another throttle setting in the new protocol.

The protocols of the messages may be determined in a variety of manners. As one example, the content of the received message may be examined in order to determine the protocol the message. Different protocols may be associated with different types of content in the messages. The data included in a received message may be compared to different sets of designated data content that are associated with different messaging protocols. Depending on which set of designated data contents that the data content in a received message matches (or more closely matches than other sets of designated data contents), the systems and methods described herein can determine the messaging protocol of the received message. Optionally, the message may identify the protocol used by the message. For example, a received message may include identifying data or datum that represents or identifies the protocol in which the message is communicated.

The messaging protocol used by a system in sending messages to other systems may change based on the protocol of a message received by the system. With respect to vehicle concepts, a remote vehicle may be configured to use a first messaging protocol for sending messages to the lead vehicle in the same vehicle consist. Upon receipt of a message from the lead vehicle in a different, second messaging protocol, the remote vehicle may change a messaging configuration of the remote vehicle so that the remote vehicle begins to use the same messaging protocol as the lead vehicle. For future messages, the remote vehicle may communicate the messages in the first messaging protocol used by the lead vehicle, as opposed to using the second messaging protocol that is not used by the lead vehicle. As a result, remote vehicles in the vehicle consist may adapt to the messaging protocol being used by the lead vehicle in the event that the lead vehicle uses a different messaging protocol than one or more, or all, of the remote vehicles in the vehicle consist.

FIG. 4 illustrates one embodiment of a communication system 100 of a vehicle consist or vehicle system 102. The illustrated vehicle consist 102 includes propulsion-generating vehicles 104, 106 (e.g., vehicles 104, 106A, 106B, 106C) and non-propulsion-generating vehicles 108 (e.g., vehicles 108A, 108B) that travel together along a route 110. Although the vehicles 104, 106, 108 are shown as being mechanically coupled with each other, optionally, the vehicles 104, 106, 108 may not be mechanically coupled with each other. The vehicles 104, 106 can represent one or more of the vehicles 12, 14 shown in FIG. 3 and/or the vehicles 108 can represent one or more of the vehicles 15 shown in FIG. 3.

The vehicles 104 may represent vehicles such as automobiles, locomotives, marine vessels, or the like, the vehicles 106 may represent trailers, rail cars, barges, or the like, and the vehicle consist 102 can represent a grouping or coupling of these vehicles. The number and arrangement of the vehicles 104, 106, 108 in the vehicle consist 102 are provided as one example and are not intended as limitations on all embodiments of the subject matter described herein.

In one embodiment, the group of vehicles 104, 106, 108 may be referred to as a vehicle system, with groups of one or more adjacent or neighboring propulsion-generating vehicles 104 and/or 106 being referred to as a vehicle consist. For example, the vehicles 104, 106A, 106B, 108A, 108B, and 106C may be referred to as a vehicle system with vehicles 104, 106A, 106B be referred to as a first vehicle consist of the vehicle system and the vehicle 106C referred to as a second vehicle consist in the vehicle system. Alternatively, the vehicle consists may be defined as the vehicles that are adjacent or neighboring to each other, such as a vehicle consist defined by the vehicles 104, 106A, 106B, 108A, 108B, 106C.

The propulsion-generating vehicles 104, 106 can be arranged in a DP arrangement. For example, the propulsion-generating vehicles 104, 106 can include a lead vehicle 104 that issues command messages to the other propulsion-generating vehicles 106A, 106B, 106C which are referred to herein as remote vehicles. The designations "lead" and "remote" are not intended to denote spatial locations of the propulsion-generating vehicles 104, 106 in the vehicle consist 102, but instead are used to indicate which propulsion-generating vehicle 104, 106 is communicating (e.g., transmitting, broadcasting, or a combination of transmitting and broadcasting) command messages and which propulsion-generating vehicles 104, 106 are being remotely controlled using the command messages. For example, the lead vehicle 104 may or may not be disposed at the front end of the vehicle consist 102 (e.g., along a direction of travel of the vehicle consist 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or non-propulsion-generating vehicles 108.

The command messages may include directives that direct operations of the remote vehicles. These directives can include propulsion commands that direct propulsion subsystems of the remote vehicles to move at a designated speed and/or power level, brake commands that direct the remote vehicles to apply brakes at a designated level, and/or other commands. The lead vehicle 104 issues the command messages to coordinate the tractive efforts and/or braking efforts provided by the propulsion-generating vehicles 104, 106 in order to propel the vehicle consist 102 along a route 110, such as a track, road, waterway, or the like.

The command messages can be communicated using the communication system 100. In one embodiment, the command messages are wirelessly communicated using the communication system 100. The communication system 100 may include wireless transceiving hardware and circuitry disposed onboard two or more of the vehicles 104, 106. Prior to the remote vehicles being remotely controlled by a lead vehicle in the vehicle consists, communication links may be established between the lead and remote vehicles.

Figure 5:
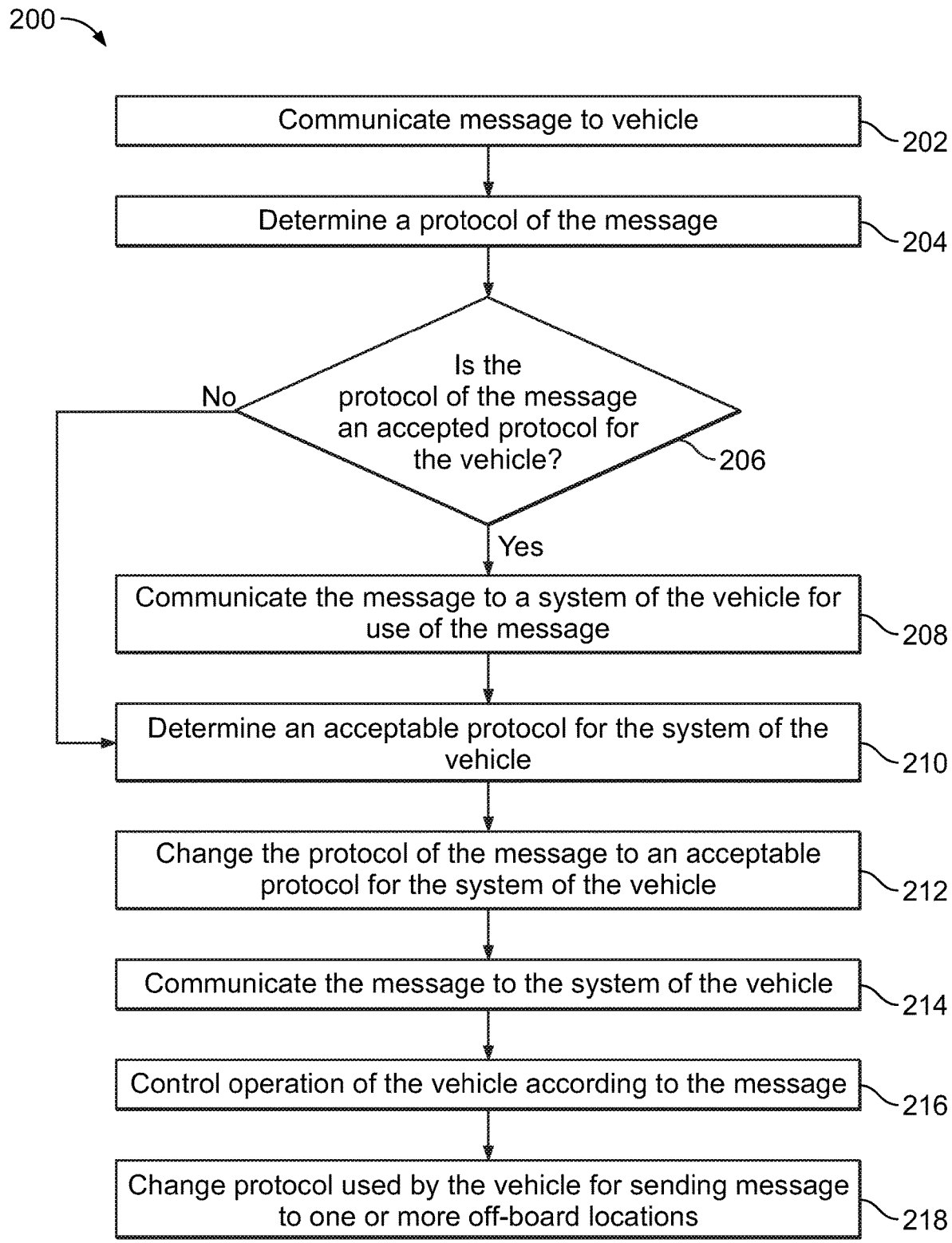
FIG. 5 illustrates a flowchart of one embodiment of a method for converting protocols of messages.

FIG. 5 illustrates a flowchart of one embodiment of a method 200 for converting protocols of messages. The method 200 may be performed by one or more embodiments of the communication systems described herein. At 202, a message is communicated to the vehicle. The message may be wirelessly communicated to vehicle from another vehicle, such as a lead vehicle communicating a command message to a remote vehicle in order to remotely control movement of the remote vehicle. Optionally, the message may be communicated from an off-board location to the vehicle, from the remote vehicle to the lead vehicle, or from another location. A device located off-board the vehicle (e.g., an operator hand-held remote control) may remotely control movement of the vehicle by communicating wireless messages to the vehicle. While the description herein focuses on wireless communication messages, embodiments of the subject matter may relate communication of messages and other manners. For example, determining and changing messaging protocols as described herein also may be used with messages communicated over one or more conductive pathways, such as wires, cables, rails, bus bars, or the like. Additionally, the description herein focuses on vehicles, embodiments of the subject matter described herein also may relate to non-vehicle systems.

The message may be a command message that directs a vehicle to change operational settings. For example, a command message may be sent from a lead vehicle to a remote vehicle in order for the lead vehicle to remotely control a throttle setting, brake setting, speed, acceleration, or the like, of the remote vehicle. Optionally, the message may be a reply or response message sent from a remote vehicle to a lead vehicle to confirm receipt of a lead message and/or to notify the lead vehicle that the change in operational settings has been implemented.

At 204, a protocol of the message is determined. In one embodiment, the data content of the message may be examined in order to identify the protocol of the received message. The data content of a message can include the information included in the message, such as data represented by different bits, bytes, or the like, in the message. Different messaging protocols may format the data content of the message in different manners. For example, different messaging protocols may place the same information in different orders within the messages, using different values in the messages, in different locations within the messages (e.g., headers, payloads, trailers, or the like), etc. The data that is included in the received message can be examined to determine whether or not the format of the data corresponds to or matches the manner in which one or more protocols are known to format data within messages.

In one aspect, different sets of designated data contents, or formats of data contents, may be associated with different messaging protocols. The data content, or at least a portion thereof, of a received message can be examined and compared to the different sets of data content. If the format of the data content in a received message matches a set of designated data content associated with a first messaging protocol (or more closely matches the set of designated data content associated with the first messaging protocol than other sets of designated data contents associated with other messaging protocols), then the received message may be identified as being in the first messaging protocol.

Figure 6:
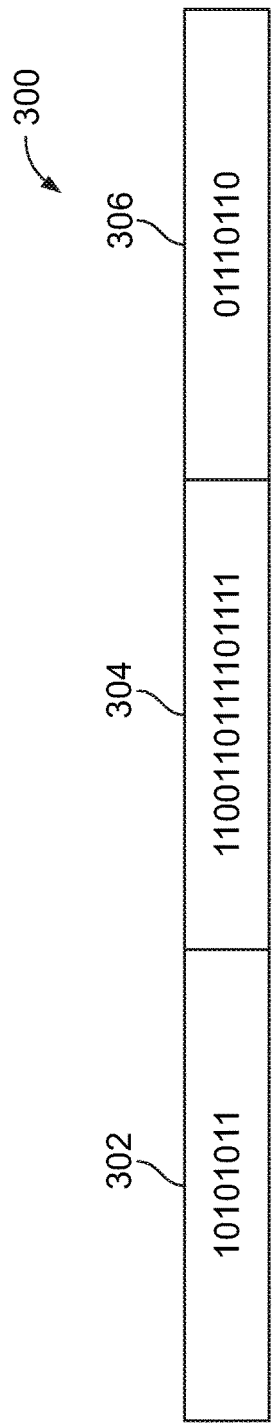
FIG. 6 is a schematic diagram of a message in accordance with one embodiment.

FIG. 6 is a schematic diagram of a message 300 in accordance with one embodiment. The message 300 may be communicated as a series of bits that are included or arranged in frames, such as a header frame 302, a data (or payload) frame 304, and a footer (or trailer) frame 306. Alternatively, the message 300 may be composed of a series of bits that are arranged in another format. The arrangement of the bits in the message 300 may indicate which protocol is used to communicate the message 300. For example, one or more bits in the header frame 302 and/or the footer frame 306 may indicate the format that is used to communicate the message 300. The data frame 304 can include bits that represent information conveyed by the message 300, such as a value of one or more settings, data parameters, or the like.

One or more subsets of the header frame 302, the data frame 304, and/or the footer frame 306 can be examined to determine the protocol of the message 300. For example, one or more bits of the message 300 can be extracted and compared to different identification sets of bits associated with different messaging protocols. Based on this comparison, the protocol of the message 300 can be determined. In one embodiment, the extracted set of bits from the message 300 (e.g., the first through nth bits in one or more of the frames 302, 304, and/or 306) to one or more identification sets of bits recorded in a memory, such as a table (e.g., a look-up table), list, or other logical structure, to determine a degree of match between the extracted bits and the recorded sets. The identification sets may include different sets of bits that are associated with different message protocols.

The degree of match between the extracted set from the message 300 and an identification set can be measured as a percentage, fraction, or other quantifiable measurement that represents how much of the extracted set is the same as the identification set. If the degree of match between the extracted set and the identification set exceeds a threshold, then the protocol of the message 300 is identified as the format associated with the identification set in the memory. On the other hand, if the degree of match does not exceed the threshold, then the protocol of the message 300 is not identified as the protocol associated with the identification set in the memory structure.

As another example, the received message may identify the messaging protocol of the message. The message can include identifying data or datum that represents the protocol of the message. Different protocols may be associated with different names, different numerical values included in the message, or other information that is included in the message. This may be data that is added to the message in order to identify the protocol. Based on the presence of this identifying information, the protocol of the received message can be identified. Alternatively, the absence of identifying information may be used to identify the protocol of a received message. For example, one or more protocols may not include identifying information in messages communicating using the one or more protocols. The failure to find the identifying information in a received message may be used to determine that the received message is communicated using one of these protocols.

Returning to the description of the flowchart of the method 200 shown in FIG. 5, at 206, a determination is made as to whether or not the protocol of the received message is an accepted protocol for the vehicle. An accepted protocol represents a protocol that can be read, understood, or otherwise used by the vehicle or a system of the vehicle. An unacceptable protocol includes protocols that are not able to be read, understood, or otherwise used by the vehicle or system that is onboard the vehicle. The acceptable protocols for the vehicle and/or system of the vehicle may be stored in a memory of the vehicle (described below).

If the protocol of the received message is an acceptable protocol, then the protocol the message may not need to be converted to another protocol in order for the vehicle to use the received message. As a result, flow of the method 200 can proceed to 208. On the other hand, if the protocol of the received message is not an acceptable protocol for the vehicle or system of the vehicle, then the protocol of the message may need to be converted before the vehicle or system of the vehicle can use the message. As a result, flow of the method 200 can proceed to 210.

At 210, an acceptable protocol for the vehicle is determined. For example, a system onboard the vehicle may be able to read, understand, or otherwise use messages communicated in one or more designated protocols. The acceptable protocol or protocols may be stored in a memory of the vehicle (described below).

At 212, the protocol of the message is changed to an acceptable protocol of the vehicle and/or system of the vehicle that will be using the message. The message protocol can be changed in one or more ways. For example, changing the format of the message can modify the protocol of the message from an unacceptable protocol to an acceptable protocol. In one aspect, the protocol of the message can be converted into another protocol by changing a syntax of a set of bits of the data included in the message. As another example of protocol conversion, one or more subsets of bits of the data in the message can be unpacked or extracted for inclusion into a different, second message that is in another protocol. The protocol of a message can be changed by converting the data in the message by normalizing values of the data. The above examples are not all inclusive as additional conversion mechanisms may be used to change the protocol of a message. The protocol of a message can be changed from a first protocol (e.g., a first closed format) to a different, second protocol (e.g., an open format or a different, second closed format). The protocol of a message can be changed by modifying the values and/or order of one or more subsets of the message (e.g., such as the bits in the message 300 shown in FIG. 6).

In one embodiment, the protocol of a message is converted by changing an identification of a numerical value that is conveyed by the message. For example, different numerical values may be included in a message to represent different operational settings that a system or the vehicle is to implement (e.g., throttle settings, brake settings, speeds, accelerations, etc.). These values can be referred to as data parameters, and may be identified in messages by different or unique identification numbers or alphanumeric strings. The identifications of the data parameters may be conveyed in the messages (e.g., the message 300 shown in FIG. 6) to notify recipients of the message of the data parameter that is represented by the message. The identifications may be conveyed in the header frame 302 (shown in FIG. 6) of the message that communicates the data parameter, or in another location.

The identifications used to distinguish between the different data parameters may vary between different protocols. The identification in a first message may be changed to a different identification used by a different, second protocol. The identification used in the message of a first protocol that is received may be referred to as an input data parameter identification and the identification used in the message of a second protocol after converting the message protocol may be referred to as an output data parameter identification.

In another example, the protocol of a message can be converted to another protocol by changing a size of the message. Different protocols may use differently sized messages. For example, a first protocol may use a first number of bits to convey the message 300 (shown in FIG. 6) while a different, second protocol may use a different, second number of bits to convey the message 300. The size of the message in a first protocol that is received may be referred to as an input size of the message and the converted size of the message in the different, second protocol may be referred to as an output size of the message. Changing the size of a message can involve removing portions of the message that do not change the value of the data parameter. Changing the size of a message can involve adding one or more bits to the message that do not alter the value of the data parameter conveyed by the message.

In another example, the protocol of a message is changed by applying a multiplier to one or more values represented by data in the message. For example, the value represented by data in the message can be multiplied by one or more constants to change the value from an initial value to a converted value. For example, an initial value (I) in a message may be multiplied by a constant (k) to create a converted value (C=I×k). The converted value is included in the message in the converted protocol.

In another example, the protocol of a message can be changed by applying a divisor to one or more values represented by data in the message. For example, the value represented by data in the message can be divided by one or more constants to change the value from an initial value to a converted value. An initial value (I) in the message in a first protocol may be divided by a constant (k) to create a converted value (C=I/k). The converted value can be included in the message in the converted protocol.

In another example, the protocol of a message can be changed by applying a bias to one or more values represented by data in the message. One or more constants may be added to or subtracted from a value of data in the message to change the value from an initial value to a converted value and thereby convert the protocol of the message. For example, an initial value (I) may be changed by a constant (b) to create a converted value (C=I+b). The converted value can be included in the message in the converted protocol.

In another example, the protocol of a message can be changed by altering a position of a decimal in one or more values represented by data in the message. The position of a decimal in a value of a message in a first protocol may be shifted to another position to convert the protocol of the message to a second protocol. For example, an input message may include a value of 123.456. Converting the protocol of the message may occur by shifting the decimal point of the value to 12.3456 or 1234.56 and including the value having the shifted decimal point in a converted protocol message.

The protocol of a message can be changed by extracting a portion of the message and conveying the extracted portion in another message. For example, based on the protocol of the received message and the acceptable protocol of the vehicle that received the message, a start bit and a number of read bits may be identified. Different protocols may be associated with different starting bits and/or different numbers of read bits in a memory. Based on the identified protocol of the received message and the acceptable protocol of the vehicle or system, the starting bit and number of read bits can be determined. The start bit indicates where in a data string that a portion of the data is to be extracted from and the number of read bits identifies how much of the data string starting at the start bit is to be extracted. As one example, a message may include the data string represented as "HGFEDCBA." If the start bit is four and the number of read bits is one, the bit "E" may be extracted from the message and included in a message in a converted protocol.

The preceding provides some examples of the manners in which the protocol of a message can be changed. The above examples, however, are not exclusive. Other techniques and methods of converting the protocol of the messages may be used.

Returning to the description of the flowchart the method 200 shown in FIG. 5, at 214, the message in the converted protocol is communicated to a system of the vehicle, such as a control system or control unit (described below). The message in the converted protocol may be communicated to the control system or other system that uses information included in the message of the converted protocol to control one or more operations of the vehicle. For example, a control system of the vehicle may change a throttle setting, brake setting, speed, acceleration, or the like, of the vehicle based on information included in the message in the converted protocol. In doing so, a lead vehicle using a first messaging protocol can remotely control movement of a remote vehicle that cannot understand or use messages in the first protocol, but that can understand or use messages in a different, second messaging protocol.

At 216, operation of the vehicle is controlled according to the message in the converted protocol. A control system or unit of the vehicle may change one or more operational settings of the vehicle based on information included in the message in the converted protocol. For example, the control system may change a throttle setting, brake setting, speed, acceleration, or the like, of the vehicle based on the information included in the converted message.

In one embodiment, at 218, the protocol used by the vehicle for sending messages to one or more off-board locations is changed. For example, if the remote vehicle communicates messages using a first messaging protocol, but receives one or more messages from a lead vehicle in a different, second messaging protocol, then the remote vehicle can switch from communicating messages in the first protocol to the second protocol. The remote vehicle may begin communicating messages to the lead vehicle or other vehicles using the second messaging protocol. In doing so, the remote vehicle can adapt to different messaging protocols used by other vehicles or sources of messages. Alternatively, the method 200 may not include the operations described in connection with 218 in FIG. 5.

Figure 7:
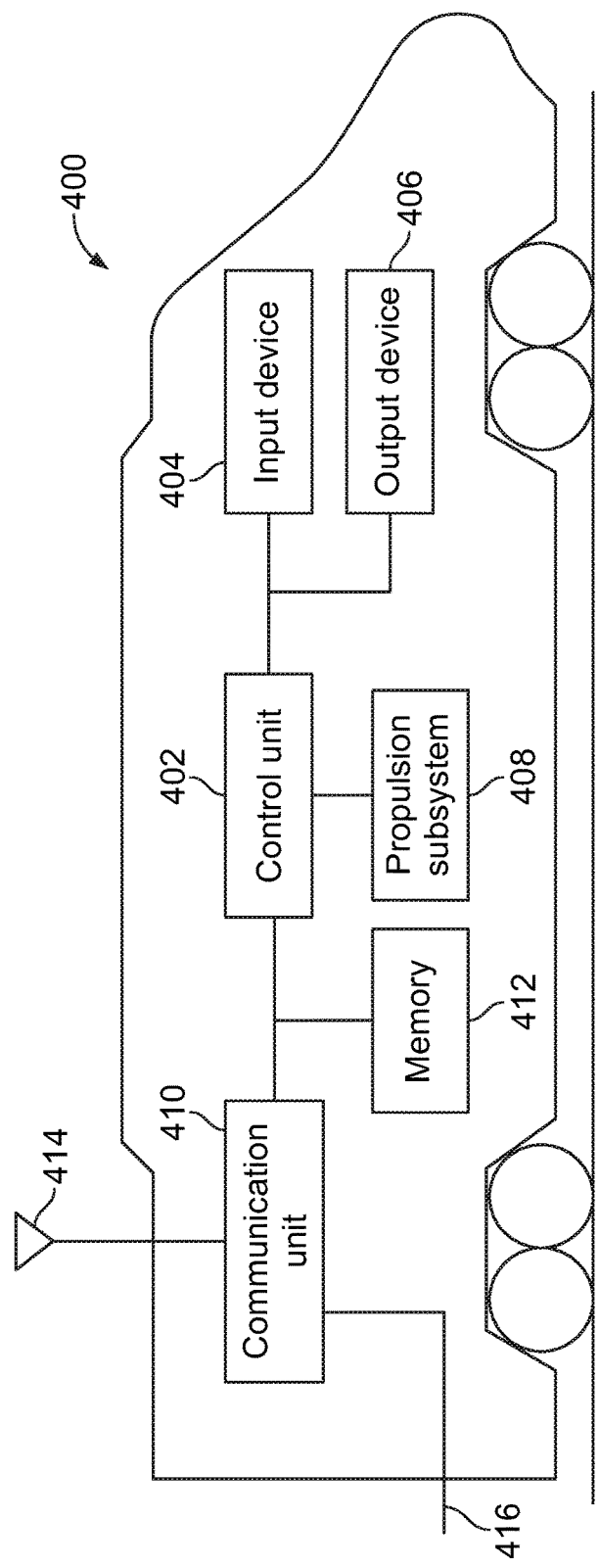
FIG. 7 is a schematic diagram of a propulsion-generating vehicle in accordance with one embodiment.

FIG. 7 is a schematic diagram of a propulsion-generating vehicle 400 in accordance with one embodiment. The vehicle 400 may represent one or more of the vehicles 104, 106 shown in FIG. 4. The communication system 100 shown in FIG. 4 may include one or more components onboard the vehicle 400 that are used to establish communication links between the vehicle 400 and one or more other vehicles in the same vehicle consist.

The vehicle 400 includes a control unit or control system 402 that controls operations of the vehicle 400. The control unit 402 can include or represent one or more hardware circuits or circuitry that include, are connected with, or that both include and are connected with one or more processors, controllers, or other hardware logic-based devices. In one embodiment, the control unit 402 represents one or more of the processors 60 shown in FIG. 3. The control unit 402 is connected with an input device 404 and an output device 406. The control unit 402 can receive manual input from an operator of the propulsion-generating vehicle 400 through the input device 404, such as a touchscreen, keyboard, electronic mouse, microphone, or the like. For example, the control unit 402 can receive manually input changes to the tractive effort, braking effort, speed, power output, and the like, from the input device 404. The control unit 402 can present information to the operator using the output device 406, which can represent a display screen (e.g., touchscreen or other screen), speakers, printer, or the like. For example, the control unit 402 can present the contents, protocols, or the like, of messages received by the vehicle 400 and/or communicated from the vehicle 400.

The control unit 402 is connected with a propulsion subsystem 408 of the propulsion-generating vehicle 400. The propulsion subsystem 408 provides tractive effort and/or braking effort of the propulsion-generating vehicle 400. The propulsion subsystem 408 may include or represent one or more engines, motors, alternators, generators, brakes, batteries, turbines, and the like, that operate to propel the propulsion-generating vehicle 400 under the manual or autonomous control that is implemented by the control unit 400. For example, the control unit 400 can generate control signals autonomously or based on manual input that is used to direct operations of the propulsion subsystem 408.

The control unit 402 also is connected with a communication unit 410 and a memory 412 of the communication system in the propulsion-generating vehicle 400. The memory 412 can represent an onboard device that electronically and/or magnetically stores data. For example, the memory 412 may represent a computer hard drive, random access memory, read-only memory, dynamic random access memory, an optical drive, or the like. The communication unit 410 includes or represents hardware and/or software that is used to communicate with other vehicles 400 in the vehicle consist 102. For example, the communication unit 410 may include a transceiver and associated circuitry (e.g., antennas) 414 for wirelessly communicating (e.g., communicating and/or receiving) messages. Optionally, the communication unit 410 includes circuitry for communicating the messages over a wired connection 416, such as an electric multiple unit (eMU) line of the vehicle consist 102 or another conductive pathway between or among the propulsion-generating vehicles 104, 106, 400 in the vehicle consist 102. The control unit 402 may control the communication unit 410 by activating the communication unit 410.

The communication unit 410 can examine the messages that are received by the vehicle 400 and determine whether the protocol of the messages needs to be changed. As described above, the communication unit 410 can determine the protocol of received messages, determine if the protocol is acceptable to the vehicle 400 or the control unit 402 of the vehicle 400, and change the protocol of the message (which may include forming a new message with the new protocol or changing the protocol of the received message without forming a new message).

The memory 412 can store messaging protocols and information used to determine protocols of received messages, information to determine acceptable protocols of the vehicle 400 and/or control unit 412, information on how to change protocols of a message, and the like. For example, the memory 412 can store sets of data content of messages associated with different protocols, identifying information included in messages associated with different protocols, and other information described herein that can be used by the communication unit 410 to determine the protocol of a received message.

In one embodiment, a method (e.g., for converting protocols of messages) includes receiving a first wireless message onboard a first vehicle in a vehicle consist that includes the first vehicle and one or more additional vehicles, determining a first protocol of the first wireless message, determining a different, second protocol used by a control system disposed onboard the first vehicle, changing the first wireless message to a different, second message by modifying the first protocol of the first wireless message to the different, second protocol, and communicating the second message to the control system.

In one aspect, receiving the first wireless message can include receiving the first wireless message from a second vehicle of the one or more additional vehicles. The method also can include controlling movement of the first vehicle based at least in part on data included in the first wireless message.

In one aspect, the first vehicle and the second vehicle can be different types of vehicles.

In one aspect, receiving the first wireless message can include receiving the first wireless message from a stationary facility disposed off-board the vehicle consist. The method also can include controlling movement of the first vehicle based at least in part on data included in the first wireless message.

In one aspect, changing the first wireless message to the different, second message can include changing first data content of the first wireless message to different, second data content of the second message.

In one aspect, determining the first protocol of the first wireless message can include comparing data content of the first wireless message with designated data contents associated with different message protocols and selecting the second protocol from among the different message protocols based (at least in part) on comparing the data content of the first wireless message with the designated data contents associated with the different message protocols.

In one aspect, determining the first protocol of the first wireless message can include examining protocol identifying datum or data included in the first wireless message that identifies the first protocol.

In one aspect, prior to determining the first protocol of the first wireless message received at the first vehicle, the first vehicle can be configured to communicate one or more other wireless messages in one or more other protocols that differ from the first protocol.

In one aspect, the method can include changing a communication configuration of the first vehicle responsive to determining the first protocol of the first wireless message received at the first vehicle such that one or more third wireless messages communicated from the first vehicle to the second vehicle are communicated in the first protocol.

In another embodiment, a system (e.g., a communication system) includes a communication unit having transceiving circuitry configured to be disposed onboard a first vehicle in a vehicle consist that includes the first vehicle and one or more additional vehicles. The communication unit can be configured to receive a first wireless message and to determine a first protocol of the first wireless message, and to determine a different, second protocol used by a control system disposed onboard the first vehicle. The communication unit also can be configured to change the first wireless message to a different, second message by modifying the first protocol of the first wireless message to the different, second protocol, and to communicate the second message to the control system.

In one aspect, the communication unit can be configured to receive the first wireless message from a second vehicle of the one or more additional vehicles. The system also can include the control system that is configured to control movement of the first vehicle based at least in part on data included in the first wireless message.

In one aspect, the first vehicle and the second vehicle can be different types of vehicles.

In one aspect, the communication unit can be configured to receive the first wireless message from a stationary facility disposed off-board the vehicle consist. The system also can include the control system that is configured to control movement of the first vehicle based at least in part on data included in the first wireless message.

In one aspect, the communication unit can be configured to change the first wireless message to the different, second message by changing first data content of the first wireless message to different, second data content of the second message.

In one aspect, the communication unit can be configured to determine the first protocol of the first wireless message by comparing data content of the first wireless message with designated data contents associated with different message protocols and selecting the second protocol from among the different message protocols based on comparing the data content of the first wireless message with the designated data contents associated with the different message protocols.

In one aspect, the communication unit can be configured to determine the first protocol of the first wireless message by examining protocol identifying datum or data included in the first wireless message that identifies the first protocol.

In one aspect, prior to determining the first protocol of the first wireless message received at the first vehicle, the communication unit can be configured to communicate one or more other wireless messages to the second vehicle in one or more other protocols that differ from the first protocol. The communication unit can be configured to change a communication configuration of the communication unit responsive to determining the first protocol of the first wireless message received at the first vehicle such that one or more third wireless messages communicated from the communication unit to the second vehicle are communicated in the first protocol.

In another embodiment, a method (e.g., for converting protocols of messages) includes receiving a first message at a remote vehicle from a lead vehicle in a vehicle consist that includes the lead vehicle remotely controlling movement of the remote vehicle along a route, determining a first protocol of the first message, determining a different, second protocol used by a control system disposed onboard the remote vehicle, changing the first protocol of the first message to the second protocol, and communicating the first message in the second protocol to the control system of the remote vehicle to control the movement of the remote vehicle.

In one aspect, the lead vehicle and the remote vehicles can be different types of vehicles.

In one aspect, the method also can include changing a protocol used by the remote vehicle to communicate a reply message to the lead vehicle responsive to determining the first protocol of the command message received from the lead vehicle.

One or more embodiments of the inventive subject matter described herein provide vehicle control systems that detect losses in communication between two or more vehicles in the same vehicle system and automatically determine a transitional plan to shift operation (e.g., movement) of the vehicle system from a current state (e.g., traveling at a speed limit of a route) to a reduced state (e.g., traveling at a reduced speed limit). The transitional plan may be generated and/or implemented automatically to change throttle settings, brake settings, or the like, of the vehicle system without requiring operator intervention or action. This can reduce distractions to the operator and allow the operator to continue monitoring other operations of the vehicle system during transition from the current state to the reduced state. The control systems may detect when the communication loss is terminated (e.g., when communication between the vehicles is re-established) and, responsive to regaining communication, the control systems may automatically determine a return plan to shift operation of the vehicle system from the reduced state back to a normal or fully operational state (e.g., traveling at the speed limit of the route). The return plan may be generated and/or implemented automatically to change throttle settings, brake settings, or the like, of the vehicle system without requiring operator intervention or action.

Figure 8:
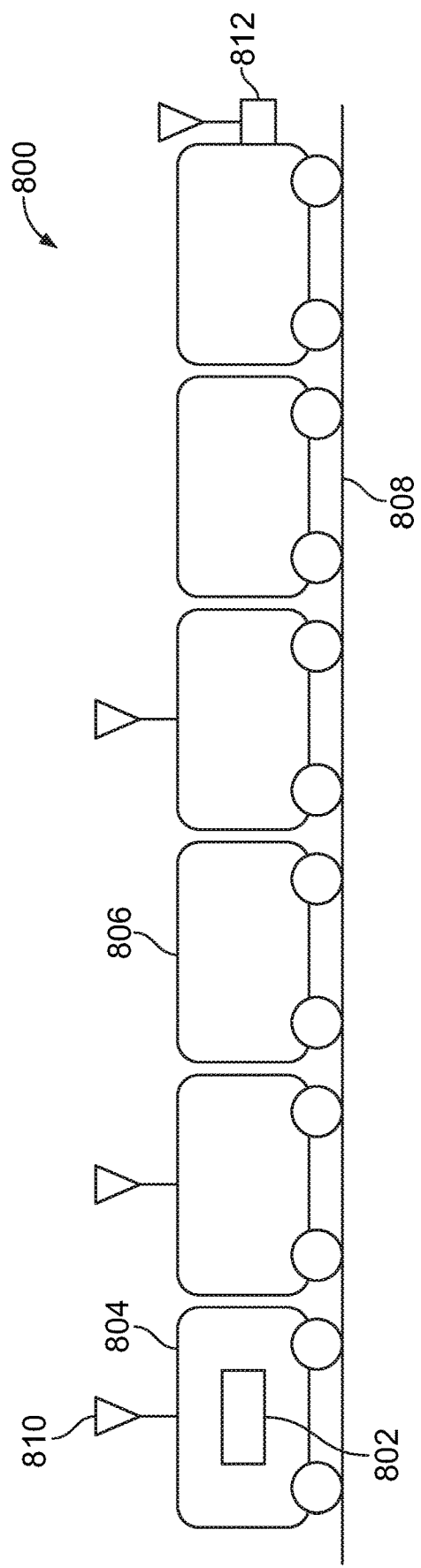
FIG. 8 illustrates one embodiment of a vehicle system having a control system disposed thereon.

FIG. 8 illustrates one embodiment of a vehicle system 800 having a control system 802 disposed thereon. The vehicle system includes two or more vehicles 804, 806 traveling together along a route 808. The vehicles 804 can include one or more propulsion-generating vehicles, such as automobiles, trucks, locomotives, marine vessels, mining vehicles, aerial vehicles (e.g., unmanned aerial vehicles, or UAVs), or other off-highway vehicles (e.g., vehicles that are not legally permitted or not designed for travel on public roadways) that generate propulsive force to move the vehicles and the vehicle system along the route. In one embodiment, the vehicles 804 represent one or more of the vehicles 12, 14 (shown in FIG. 3) 104, 106 (shown in FIG. 4), 400 (shown in FIG. 7). The vehicles 806 optionally can include one or more non-propulsion-generating vehicles, such as trailers, rail cars, barges, or the like, that do not generate propulsive force. In one embodiment, the vehicles 806 represent one or more of the vehicles 15 (shown in FIG. 3), 108 (shown in FIG. 4). The number and arrangement of the vehicles are provided merely as one example and are not limiting on all embodiments of the inventive subject matter described herein. The vehicles may be mechanically coupled with each other (e.g., by couplers) or may not be mechanically coupled, but may be logically coupled. For example, the vehicles may not be connected with each other, but may communicate with each other via onboard communication devices 810 to allow the vehicles and/or other devices described herein to communicate with each other. In one embodiment, the vehicles may communicate with each other to coordinate the propulsive and braking forces generated by the vehicles so that the vehicles travel together along the route as the vehicle system. One or more of the communication devices 810 can represent at least one of the communication unit 410 shown in FIG. 7.

At least one of the vehicles includes the control system that determines and optionally automatically implements operational settings of one or more of the vehicles. As described below, the control system may obtain an operational plan that dictates or designates different operational settings of the vehicle system and/or vehicles for different locations along the route, different times during a trip of the vehicle system, and/or different distances along the route. For example, the operational plan may designate different speeds, throttle settings, brake settings, etc., that the vehicle system and/or vehicles are to travel according to at different locations along the route. This plan may be generated to reduce fuel consumption and/or emission generation by the vehicle system (while still traveling on schedule) relative to the vehicle system traveling according to other settings (e.g., traveling at the speed limit of the route the entire time).

The control system may communicate with devices offboard the vehicle on which the control system is disposed. For example, the control system may communicate with a monitoring device 812 that is disposed onboard another vehicle of the same vehicle system. The monitoring device 812 can measure or sense characteristics of the vehicle system and report the characteristics to the control system. In one embodiment, the monitoring device 812 is an end-of-train (EOT) or end-of-vehicle (EOV) device that is disposed at a trailing end of the vehicle system (e.g., along a direction of travel of the vehicle system). The monitoring device 812 may measure characteristics such as a status of a braking system of the vehicle system (e.g., air pressure in an air brake system) and communicate this information to the control system via the communication devices of the monitoring device and the control system.

The control system may use the information provided by the monitoring device to determine whether and how to change operations of the vehicle system. For example, responsive to determining that there is insufficient air pressure in the braking system of the vehicle system to safely stop movement of the vehicle system in the event of an emergency, the control system may reduce speed of the vehicle system.

As another example, the control system may communicate with control systems disposed onboard other vehicles in the same vehicle system. For example, the control system onboard one of the vehicles may communicate with control systems onboard other vehicles (e.g., propulsion-generating vehicles) to direct the operational settings of the other vehicles. This type of arrangement can be referred to as a DP arrangement. The control system onboard the vehicle that is directing the operational settings of other vehicles may be referred to as a lead control system onboard a lead vehicle, although the lead control system may not be disposed onboard the vehicle at the front end of the vehicle system (e.g., along the direction of travel of the vehicle system).

Because of the importance of the information communicated between the control system and one or more other components disposed on other vehicles, a loss in communication between the control system and one or more of these components can present a significant safety risk. The control system may be designed (e.g., programmed or otherwise configured) to determine an operational change or restriction on operation of the vehicle system responsive to such a communication loss occurring. The operational change may limit movement or other operations of the vehicle system. For example, an operational restriction can include a reduced speed limit (e.g., a speed limit that is slower than the speed limit of the route that is in place without the communication loss), a limitation on changes in the throttle settings of the vehicle system (e.g., a prohibition on increasing the throttle setting above a limit that is lower than a maximum throttle setting of the vehicle system, a frequency limit on how often the throttle setting can change, a reduced range of throttle settings), or the like. The control system may determine a transitional plan for changing movement of the vehicle system from a current state to a reduced state that complies with the operational restriction and may then automatically implement this transitional plan. Subsequently, the operational state may change again and operate in the original manner, or in a third and completely different manner altogether. Further, in one embodiment, the restriction may be a change that reduces operating speed in sequential steps based on additional inputs or as part of a gradual and controlled ramp down. For example, the control system may generate a plan or communicate with an energy management system (described below) to obtain a plan that dictates or designates different operational settings of the vehicle system at different locations, times, and/or distances along the route. Implementation of this plan can transition operation of the vehicle system from a current state (e.g., the speed at which the vehicle system was traveling prior to or at the time when the communication loss occurred) to a reduced state (e.g., the reduced speed limit). Responsive to communication being re-established, the control system may determine or obtain a return plan that dictates or designates different operational settings of the vehicle system at different locations, times, and/or distances along the route. Implementation of this return plan can transition operation of the vehicle system from the reduced state to another state, such as the state of the vehicle system prior to or at the time of the communication loss, travel at the speed limit of the route (e.g., and not the reduced limit), or another state. These plans may be determined and/or implemented automatically (e.g., without operator intervention) to eliminate or reduce distraction to an operator of the vehicle system (relative to the operator manually determining or implementing the plans).

Figure 9:
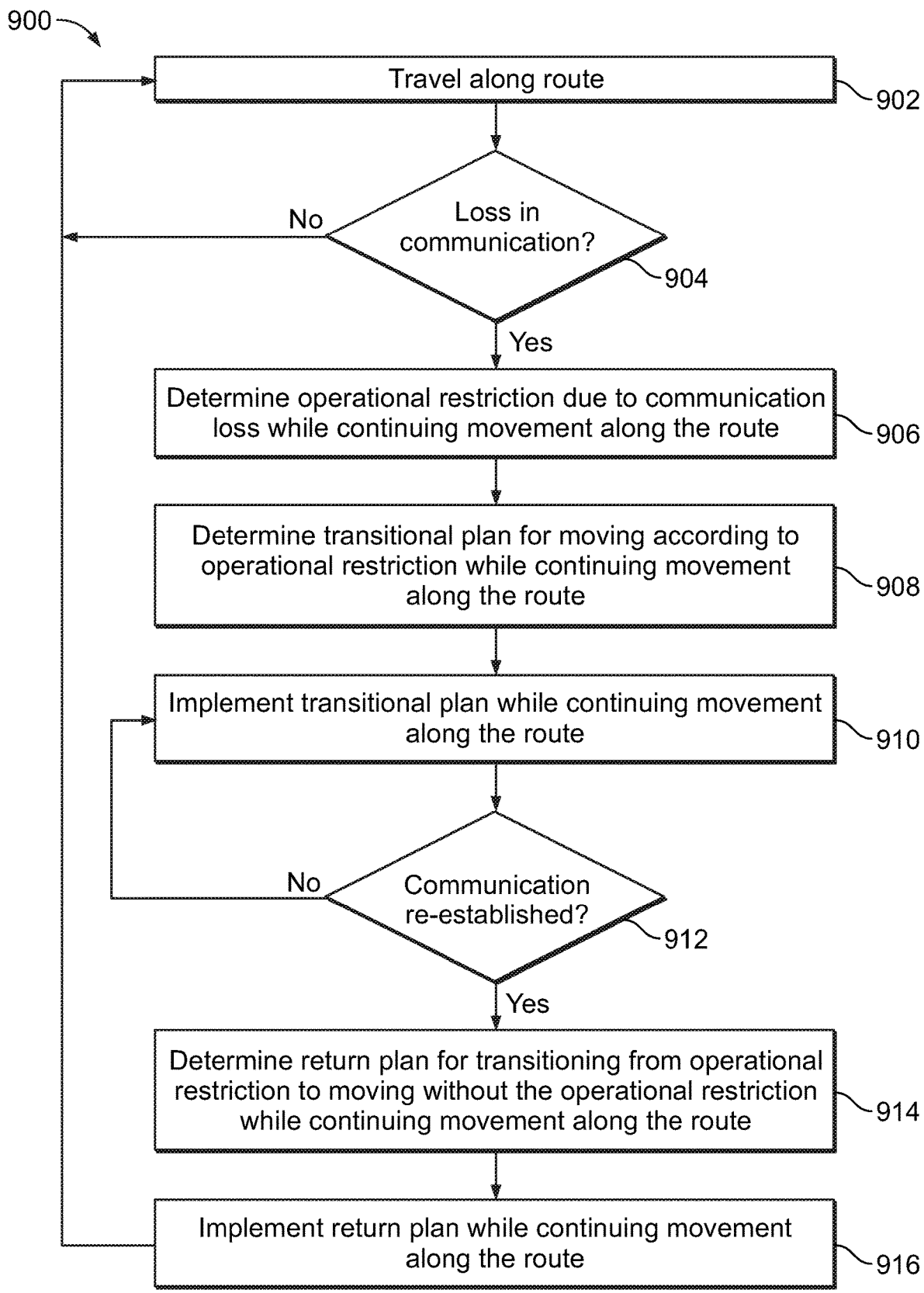
FIG. 9 illustrates a flowchart of one embodiment of a method for controlling operation of the vehicle system shown in FIG. 8.

FIG. 9 illustrates a flowchart of one embodiment of a method 900 for controlling operation of a vehicle system. The method 900 represents operations that may be performed by one or more of the processors, control units, and/or control systems described herein, the software application operating on or with one or more of the processors, control units, and/or control systems described herein, and/or an algorithm that may be used to control operation of one or more of the processors, control units, and/or control systems described herein. At 902, the vehicle system travels (e.g., moves) along a route. The vehicle system may move automatically according to an operational plan. The operational plan directs the control system to control the vehicle system to travel at different speeds, use different throttle settings, or the like, during movement along the route. The operational plan may dictate or designate different operational settings at different times, locations along the route, and/or distances along the route. The operational plan may be generated to reduce fuel consumption and/or emission generation of the vehicle system relative to the vehicle system traveling using other settings, such as by traveling at the speed limit of the route during the entire trip. In one embodiment, the operational plan may be a trip plan as described in U.S. patent application Ser. No. 14/863,998, the entire disclosure of which is incorporated herein by reference.

Figure 10:
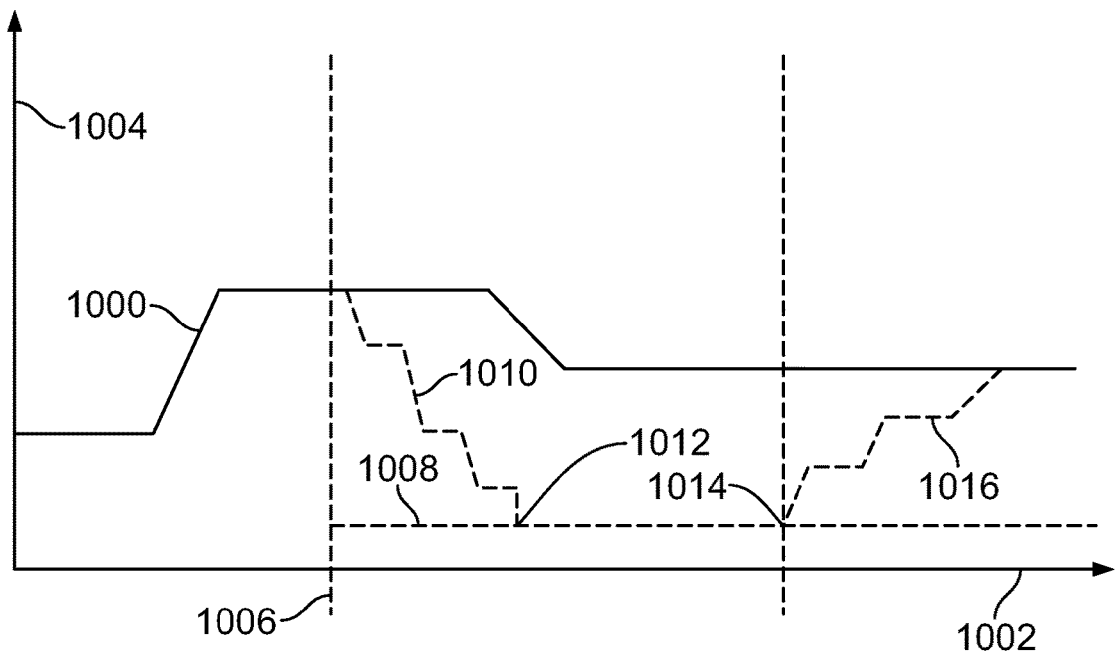
FIG. 10 illustrates one example of movement of the vehicle system along a route 108 shown in FIG. 8.

With continued reference to the flowchart of the method 900 shown in FIG. 9, FIG. 10 illustrates one example of movement of a vehicle system along a route. The movement of the vehicle system is represented by an operational plan 1000 shown alongside a horizontal axis 1002 and a vertical axis 1004. The horizontal axis is representative of different locations along the route, time, and/or different distances along the route. The vertical axis is representative of different operational settings of the vehicle system, such as speeds, throttle settings, or the like. As described above, the operational plan may dictate or designate different operational settings of the vehicle system at different locations along the route, times, and/or distances along the route.

At 904 in the flowchart of the method 900, a determination is made as to whether the control system has experienced or detected a communication loss. The control system may lose the ability to communicate with another vehicle and/or the monitoring device. The control system may use the information provided by the monitoring device to determine whether and how to change operations of the vehicle system. For example, responsive to determining that there is insufficient air pressure in the braking system of the vehicle system to safely stop movement of the vehicle system in the event of an emergency, the control system may reduce speed of the vehicle system.

The communication loss may occur due to interference, a fault in one or more communication devices, or the like. A communication loss may be identified responsive to the control system being unable to communicate (e.g., receive and/or send one or more signals) with another vehicle or the monitoring device for at least a designated period of time, such as at least ten seconds, at least fifteen seconds, or at least twenty seconds. If a communication loss occurs, then flow of the method 1000 can proceed toward 1006. Otherwise, flow of the method 1000 can return toward 1002. In FIG. 10, a communication loss 1006 occurs at a time, location on the route, and/or distance along the route shown along the horizontal axis 1002.

In one embodiment, the communication loss may occur when a communication path ceases to be available for one or more systems or subsystems of a vehicle system. Communications may be switched to being sent and/or received over one or more other (e.g., auxiliary) communication paths, as described above. Optionally, a communication loss may occur responsive to one or more systems onboard the vehicle system being unable to process a message or signal due to the protocol of the message or signal. For example, a wireless signal sent from one system may include a message in a first protocol that may not be able to be converted into a different, second protocol used by another system. The inability of this other system to process the signal due to the different protocol may represent a communication loss.

At 906 in the flowchart of the method 900, an operational restriction 1008 (shown in FIG. 10) on movement of the vehicle system is determined responsive to the communication loss occurring. The control system may determine the operational restriction while the vehicle system continues to move along the route. The operational restriction may be a reduced speed limit (e.g., slower than the speed limit of the route), reduced upper limit on throttle settings, or the like. The operational restriction may be based on the route and/or a current operational setting of the vehicle system. For example, different routes may be associated with different reduced speed limits that are to be used in response to a communication loss. As another example, the operational restriction may be a fraction of a current moving speed of the vehicle system, such as half of the current speed.

In one embodiment, the operational restriction may be based on or obtained from a wayside device. For example, positive train control (PTC) systems have wayside devices disposed alongside a route. These devices can communicate with nearby vehicles via wired connections (e.g., through conductive rails of a route) and/or wireless connections in order to inform the vehicles of speed restrictions. The wayside devices can communicate the operational restriction that is determined at 206 to the control system. For example, if a PTC system would require vehicle systems to travel no faster than ten kilometers per hour (kph) if an upcoming segment of the route were occupied or damaged, then this speed restriction may be communicated to the control system as the operational restriction. The speed restriction can be communicated even if the cause for implementing the speed restriction (e.g., the route occupancy or damage) is not actually occurring.

Optionally, the operational restriction may be based on a collision avoidance objective. This objective may be a goal to prevent the vehicle system from colliding with or otherwise contacting one or more other objects, such as other vehicles. For example, the operational restriction may be a reduced speed limit, a buffer distance (with the vehicle system being required to remain at least as far away as the buffer distance from other vehicles), an acceleration limitation, or other restriction that prevents the vehicle system from colliding with one or more other vehicles or objects.

At 908 in the flowchart of the method 900, a transitional plan 1010 (shown in FIG. 10) for moving the vehicle system according to the operational restriction is determined. The control system may determine the transitional plan or may obtain the transitional plan from an energy management system. The control system may determine the transitional plan to cause the vehicle system to change from moving according to a current state of the vehicle system (e.g., moving according to the operational plan or manual control of the vehicle system) to the operational restriction.

The transitional plan dictates operational settings of the vehicle system that change (with respect to time, locations along the route, and/or distance along the route) from the current operational setting of the vehicle system to the operational restriction associated with the communication loss. The current operational setting may be the operational setting of the vehicle system prior to, at, and/or subsequent to the communication loss, as shown in FIG. 10. The transitional plan differs from an immediate transition to the operational setting in that the transitional plan may not be the fastest change from the current operational setting to the operational restriction. The fastest transition may be a transition that is as quick as possible given mechanical and/or physical restrictions on the vehicle system. Optionally, the transitional plan may be determined so as to reduce the fuel consumed, emissions generated, and/or wear and tear on the vehicle system relative to a faster transition to the operational restriction.

In one embodiment, the transitional plan may be determined to reduce the operational setting (e.g., speed) of the vehicle system from the operational plan or current state to the operational restriction. The transitional plan may reduce the operational settings of the vehicle system to the operational restriction over a longer or different time period than abruptly changing the operational settings of the vehicle system to match the operational restriction. For example, instead of making a direct change from a current state to the state that complies with the operational restriction (e.g., changing from a state where the brakes are not engaged to a state where the brakes are fully engaged), the transitional plan may partially apply the braking system of the vehicle system, followed by reducing the throttle setting of the vehicle system or vehicles for a designated period of time, followed by partially apply the braking system of the vehicle system, followed by reducing the throttle setting of the vehicle system or vehicles for a designated period of time, and so on.

The transitional plan may be created to take advantage of grades and/or curvatures in the route, weather conditions, or other factors. For example, if the vehicle system is headed up an inclined segment of the route, on a curve of the route, and/or into a head wind, then the transitional plan may at least partially rely on gravitational forces pulling the vehicle system down the grade in the route, frictional forces slowing the vehicle system on the curve, and/or drag forces exerted on the vehicle system by the headwind to slow the vehicle system toward the operational restriction, instead of engaging the brake system and/or reducing the throttle settings of the vehicle system. Optionally, the transitional plan may dictate a smaller reduction in the application of the brake system and/or in the throttle setting compared to the vehicle system not traveling up the inclined grade, on the curve, and/or into the headwind. This can result in less fuel being consumed, fewer emissions being generated, less air loss in an air brake system, less wear and tear on the braking system and/or propulsion system, or the like, when compared to larger changes in the brake settings and/or throttle settings of the vehicle system.

At 910 in the flowchart of the method 900, the transitional plan may be implemented to move the vehicle system along the route. The control system may direct the propulsion system and/or brake system of the vehicle system to implement the operational settings of the transitional plan, such as by sending signals to the brake system and/or control system that indicate which brake settings and/or throttle settings are to be used by the brake system and/or control system.

The vehicle system may continue to move along the route according to the transitional plan. The transitional plan eventually causes the vehicle system to move using operational settings that are at or below the operational restriction. The operational settings of the vehicle system may eventually decrease until the settings are at or below the operational restriction at a confluence event 1012, as shown in FIG. 10. For example, if the vehicle system is traveling along the route at a speed of forty kph when the communication loss is detected or identified and the operational restriction is travel at a speed no greater than twenty kph, the transitional plan may gradually direct and cause the vehicle system to slow down and move at speeds that do not exceed twenty kph.

At 912 in the flowchart of the method 900, a determination is made as to whether communication is re-established with the device associated with the communication loss. For example, the control system may attempt to communicate with the other vehicle and/or monitoring device with which communication was lost at the communication loss. The control system may attempt to re-establish communication with the vehicle and/or monitoring device one or more following the communication loss. If the control system is able to successfully communicate with the other vehicle and/or monitoring device, then communication with the other vehicle and/or monitoring device may be re-established and flow of the method 900 may proceed toward 914.

Communication may be re-established by the control system receiving a signal sent from the other vehicle and/or monitoring device, and/or by the control system sending a signal to the other vehicle and/or monitoring device and receiving a response signal from the other vehicle and/or monitoring device. If the control system is not able to successfully communicate with the other vehicle and/or monitoring device, then communication with the vehicle and/or monitoring device may not be re-established. As a result, the method 900 may return toward 910 so that the vehicle system continues operating according to the transitional plan and/or at or below the operational restriction.

With respect to the example shown in FIG. 10, communication may be established at a re-established communication 1014. The re-establishment of communication may occur after the vehicle system has begun moving at or below the operational restriction (as shown in FIG. 10) or before the vehicle system has begun moving at or below the operational restriction.

At 914, a return plan is determined for transitioning movement of the vehicle system back to moving without the operational restriction. In contradiction to the transitional plan, a return plan 1016 (shown in FIG. 10) dictates or directs operational settings of the vehicle system that increase above the operational restriction (if the re-established communication occurs after the vehicle system is operating at or below the operational restriction) or that increase the operational settings of the vehicle system (if the re-established communication occurs before the vehicle system operates at or below the operational restriction).

In one embodiment, the return plan dictates operational settings of the vehicle system that change (with respect to time, locations along the route, and/or distance along the route) from a current operational setting of the vehicle system to the operational settings of the operational plan 1000 shown in FIG. 10. The return plan differs from an immediate transition back to the operational plan in that the return plan may not be the fastest change from the current operational setting to the operational plan. The fastest transition may be a transition that is as quick as possible given mechanical and/or physical restrictions on the vehicle system. Optionally, the return plan may be determined so as to reduce the fuel consumed, emissions generated, and/or wear and tear on the vehicle system relative to a faster transition back to the operational plan.

In one embodiment, the return plan may be determined to increase the operational setting (e.g., speed) of the vehicle system to the operational plan by increasing the operational settings of the vehicle system over a longer or different time period than abruptly changing the operational settings of the vehicle system. For example, instead of fully disengaging the brake system and/or increasing the throttle setting to a maximum setting, the return plan may partially disengage the braking system of the vehicle system and/or gradually increase the throttle setting, as shown in FIG. 10.

The return plan may be created to take advantage of grades in the route and/or weather conditions. For example, if the vehicle system is headed down a declined segment of the route and/or with a tailwind, then the return plan may at least partially rely on gravitational forces pulling the vehicle system down the grade in the route and/or forces exerted on the vehicle system by the tailwind to increase the speed of the vehicle system back to the operational plan, instead of increasing the throttle settings of the vehicle system to a maximum setting. This can result in less fuel being consumed, fewer emissions being generated, less air loss in an air brake system, less wear and tear on the braking system and/or propulsion system, or the like, when compared to larger changes in the brake settings and/or throttle settings of the vehicle system.

At 916 in the flowchart of the method 900, the return plan is implemented to cause the vehicle system to return to traveling according to the operational plan or optionally to move according to other operational settings that exceed the operational restriction. As shown in FIG. 3, the operational settings of the vehicle system may gradually increase back to or toward the operational plan. Alternatively, the control system may obtain an updated or new operational plan having different operational settings than the previous operational plan (that also exceed the operational restriction), and the vehicle system may follow the return plan to reach the updated or new operational plan.

Flow of the method 900 may return back toward 902 so that the vehicle system can continue operating at operational settings that are not restricted by the operational restriction unless and until another communication loss occurs. The method may be implemented automatically and without operator intervention so that an operator is not distracted by examining the communication loss and/or manually reducing the operational settings of the vehicle system to or below the operational restriction. Instead, this occurs automatically so that the operator can direct his or her attention on other matters, such as looking out for obstructions on the route ahead of the vehicle system.

Figure 11:
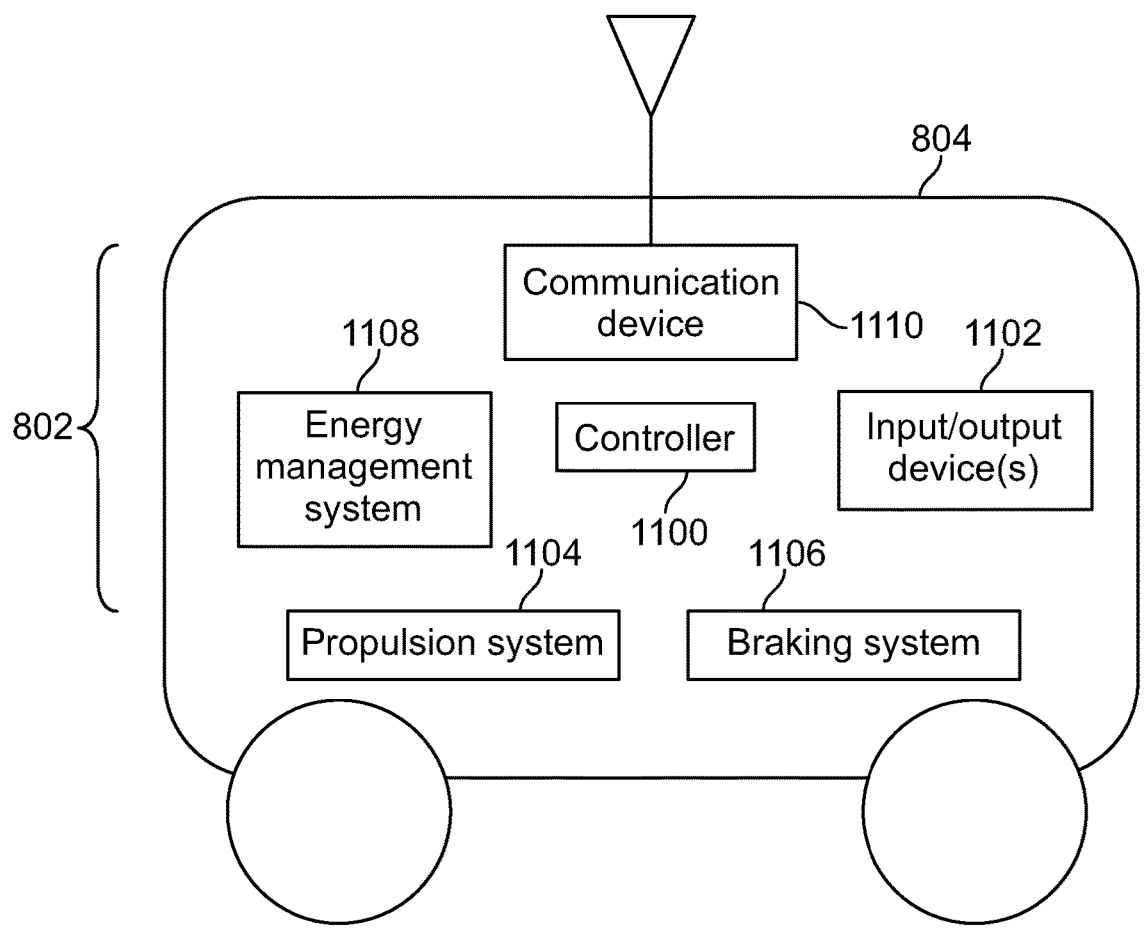
FIG. 11 illustrates one embodiment of the control system shown in FIG. 8.

FIG. 11 illustrates one embodiment of the control system 802 shown in FIG. 8. Optionally, the control system shown in FIG. 11 may represent one or more of the processors 60 shown in FIG. 3 and/or the control unit 402 shown in FIG. 7). The control system is shown as being disposed onboard a single vehicle 804, but alternatively can include components disposed onboard multiple vehicles such that the control system is distributed among the vehicles. The other vehicles 804 of the vehicle system may include some or all the same components as shown in FIG. 8. For example, one vehicle may include the control system that directs operations of other vehicles having the same or similar control systems and other components.

The control system 802 includes a controller 1100 representative of hardware circuitry that includes and/or is connected with one or more processors (e.g., microprocessors, field programmable gate arrays, integrated circuits, or the like) that perform the operations described above in connection with the method 900 shown in FIG. 9. The controller 1100 may include an internal memory in which information used to perform the method is stored (e.g., operational restrictions, operational plans, transitional plans, return plans, grades of routes, curvatures of routes, predicted weather conditions, etc.), and/or may access another memory (e.g., computer hard drive, computer disk, etc.) to obtain this information. Optionally, the controller 1100 can receive this information via the communication device 810 and/or one or more input devices 1102. In one embodiment, the controller 1100 can represent one or more of the processors 60 shown in FIG. 3 and/or the control unit 402 shown in FIG. 7.

The communication device 810 represents hardware transceiving circuitry that can communicate signals with other communication devices and/or other components via wired and/or wireless connections. The communication device 810 may include transceivers, modems, antennas, or the like, for communicating the signals.

The input/output devices 1102 represent one or more input devices and/or one or more output devices. The input devices of the devices 1102 can include one or more keyboards, microphones, touchscreens, buttons, switches, levers, or the like. The output devices of the devices 1102 can include one or more speakers, display devices, touchscreens, lights, etc.

As described above, the control system can communicate signals to a propulsion system 1104 and/or braking system 1106 of the vehicle to control operation of these systems. The propulsion system can represent the propulsion system 408 shown in FIG. 7, and may include one or more engines, alternators, generators, batteries, motors, or the like, for generating propulsive force to move the vehicle. The braking system can represent part of the propulsion system 408 (e.g., the braking components of the propulsion system 408), and may include one or more friction brakes, air brakes, dynamic brakes, or the like, for slowing or stopping movement of the vehicle.

An energy management system 1108 represents hardware circuitry that includes and/or is connected with one or more processors (e.g., microprocessors, field programmable gate arrays, integrated circuits, or the like) that generates or otherwise determines the plans described herein. The energy management system can create the operational plan, transitional plan, and/or return plan as described in connection with creating trip plans in U.S. patent application Ser. No. 14/863,998.

In one embodiment, a vehicle control system includes a controller configured to determine a communication loss between a first vehicle and one or more of a second vehicle or a monitoring device in a vehicle system that also includes the first vehicle. The controller also is configured to determine an operational restriction on movement of the vehicle system based on the communication loss that is determined. The controller also is configured to obtain a transitional plan that designates operational settings of the vehicle system at one or more different locations along a route being traveled by the vehicle system, different distances along the route being traveled by the vehicle system, or different times. The controller also is configured to automatically change the movement of the vehicle system according to the operational settings designated by the transitional plan to reduce the movement of the vehicle system to or below the operational restriction determined by the controller responsive to the communication loss being detected.

In one example, the operational restriction is a reduced speed limit that is slower than a previously designated speed limit of the route.

In one example, the transitional plan designates one or more of different throttle settings, different brake settings, or different speeds of the vehicle system at the one or more different locations along the route, different distances along the route, or different times.

In one example, the controller is configured to automatically change the movement of the vehicle system according to the transitional plan by automatically changing one or more of a throttle setting or a brake setting of the vehicle system to slow the movement of the vehicle system to below the operational restriction.

In one example, the controller is configured to receive the operational restriction from a wayside device disposed offboard the vehicle system.

In one example, the controller is configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

In one example, the controller is configured to determine re-establishment of communication between the first vehicle and the one or more of the second vehicle or the monitoring device. The controller also can be configured to obtain a return plan that designates different operational settings of the vehicle system at the one or more different locations along the route, different distances along the route being traveled by the vehicle system, or different times to increase the movement of the vehicle system above the operational restriction.

In one example, the controller is configured to obtain the return plan responsive to the communication being re-established and to automatically change the movement of the vehicle system according to the different operational settings designated by the return plan.

In one embodiment, a vehicle control system includes a controller configured to determine a communication loss between a first vehicle and one or more of a second vehicle or a monitoring device in a vehicle system that also includes the first vehicle. The controller is configured to determine an operational restriction on movement of the vehicle system based on the communication loss that is determined. The controller also is configured to change the movement of the vehicle system according to operational settings designated by a transitional plan to reduce the movement of the vehicle system to or below the operational restriction determined by the controller responsive to the communication loss being detected. The controller also is configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

In one example, the operational restriction is a reduced speed limit that is slower than a previously designated speed limit of a route.

In one example, the transitional plan designates one or more of different throttle settings, different brake settings, or different speeds of the vehicle system at one or more different locations along a route, different distances along the route, or different times.

In one example, the controller is configured to automatically change the movement of the vehicle system according to the transitional plan by automatically changing one or more of a throttle setting or a brake setting of the vehicle system to slow the movement of the vehicle system to below the operational restriction.

In one example, the controller is configured to receive the operational restriction from a wayside device disposed off-board the vehicle system.

In one example, the controller is configured to obtain the transitional plan responsive to the communication loss being determined.

In one example, the controller is configured to determine re-establishment of communication between the first vehicle and the one or more of the second vehicle or the monitoring device. The controller also can be configured to obtain a return plan that designates different operational settings of the vehicle system at the one or more different locations along a route, different distances along the route being traveled by the vehicle system, or different times to increase the movement of the vehicle system above the operational restriction.

In one example, the controller is configured to obtain the return plan responsive to the communication being re-established and to automatically change the movement of the vehicle system according to the different operational settings designated by the return plan.

In one embodiment, a vehicle control system includes a controller configured to determine a communication loss between a first vehicle and one or more of a second vehicle or a monitoring device in a vehicle system that also includes the first vehicle. The controller is configured to determine an operational restriction on movement of the vehicle system based on the communication loss that is determined. The controller also is configured to obtain a transitional plan that designates operational settings of the vehicle system and to automatically change the movement of the vehicle system according to the operational settings designated by the transitional plan to reduce the movement of the vehicle system to or below the operational restriction determined by the controller responsive to the communication loss being detected. The controller also is configured to determine re-establishment of communication between the first vehicle and the one or more of the second vehicle or the monitoring device, and is configured to obtain a return plan that designates different operational settings of the vehicle system to increase the movement of the vehicle system above the operational restriction.

In one example, the operational restriction is a reduced speed limit that is slower than a previously designated speed limit of a route.

In one example, each of the transitional plan and the return plan designates one or more of different throttle settings, different brake settings, or different speeds of the vehicle system at one or more different locations along a route, different distances along the route, or different times.

In one example, the controller is configured to automatically change the movement of the vehicle system according to the operational settings designated by the transitional plan and according to the operational settings designated by the return plan.

In one embodiment, a vehicle control system includes a controller configured to communicate via a first communication path between a first vehicle and one or more of a second vehicle or a monitoring device in a vehicle system that also includes the first vehicle. The controller also is configured to determine a communication loss via the first communication path and, responsive to determining the communication loss, the controller is configured to switch to communicating via a different, second communication path between the first vehicle and the one or more of the second vehicle or the monitoring device. The controller also is configured to determine an operational restriction on movement of the vehicle system based on the communication loss that is determined, and is configured to obtain a transitional plan that designates operational settings of the vehicle system at one or more different locations along a route being traveled by the vehicle system, different distances along the route being traveled by the vehicle system, or different times. The controller also is configured to automatically change the movement of the vehicle system according to the operational settings designated by the transitional plan to reduce the movement of the vehicle system to or below the operational restriction determined by the controller responsive to the communication loss being detected.

In one example, the controller is configured to change a format of a message previously communicated via the first communication path for communication via the second communication path.

In one example, the controller is configured to change the format of the message by one or more of restricting the message to be compliant with a smaller bandwidth capacity of the second communication path relative to the first communication path or removing information from the message.

In one example, the first communication path is a radio frequency wireless communication path and the second communication path is one or more of a wired communication path, an audio communication path, an infrared optical communication path, an ultraviolet optical communication path, a visible light optical communication path, a communication path that communicates using vibrations, or a thermal communication path.

In one example, the controller is configured to determine a first protocol used to communicate one or more messages via the first communication path and a different, second protocol used to communicate one or more messages via the second communication path. The controller also can be configured to switch from communicating messages in the first protocol to communicating messages in the second protocol responsive to determining the communication loss.

In one example, the controller is configured to determine the first protocol by comparing data content of the one or more messages communicated via the first communication path with designated data contents associated with different message protocols.

In one example, the controller is configured to determine the first protocol by examining protocol identifying datum or data included in the one or more messages communicated via the first communication path.

In one example, the operational restriction is a reduced speed limit that is slower than a previously designated speed limit of the route.

In one example, the transitional plan designates one or more of different throttle settings, different brake settings, or different speeds of the vehicle system at the one or more different locations along the route, different distances along the route, or different times.

In one example, the controller is configured to automatically implement the operational settings designated by the transitional plan such that the vehicle system one or more of consumes less fuel or generates fewer emissions compared to the controller directly changing the movement of the vehicle system from a current operational setting at a time when the communication loss occurs to the operational restriction that is based on the communication loss.

In one embodiment, a vehicle control system includes a controller configured to communicate a message in a first protocol from a first vehicle in a vehicle system that also includes one or more of a second vehicle or a monitoring device in the vehicle system. The one or more of the second vehicle or the monitoring device are configured to communicate a message in a different, second protocol. The controller is configured to switch from communicating the message in the first protocol with the one or more of the second vehicle or the monitoring device to communicating the message in the second protocol with the one or more of the second vehicle or the monitoring device. The controller also is configured to determine an operational restriction on movement of the vehicle system based on the communication loss that is determined. The controller also is configured to obtain a transitional plan that designates operational settings of the vehicle system at one or more different locations along a route being traveled by the vehicle system, different distances along the route being traveled by the vehicle system, or different times. The controller is configured to automatically change the movement of the vehicle system according to the operational settings designated by the transitional plan to reduce the movement of the vehicle system to or below the operational restriction determined by the controller responsive to the communication loss being detected.

In one example, the controller is configured to determine the second protocol used by the one or more of the second vehicle or the monitoring device by comparing data content of one or more messages received by the controller from the one or more of the second vehicle or the monitoring device with designated data contents associated with different message protocols.

In one example, the controller is configured to determine the second protocol used by the one or more of the second vehicle or the monitoring device by comparing data content of one or more messages received examining protocol identifying datum or data included in the one or more messages received from the one or more of the second vehicle or the monitoring device.

In one example, the controller is configured to communicate with the one or more of the second vehicle or the monitoring device via a first communication path and, responsive to a communication loss in the first communication path. The controller can be configured to switch to communicating with the one or more of the second vehicle or the monitoring device via a different, second communication path.

In one example, the controller is configured to change a format of a message previously communicated via the first communication path for communication via the second communication path.

In one example, the controller is configured to change the format of the message by one or more of restricting the message to be compliant with a smaller bandwidth capacity of the second communication path relative to the first communication path or removing information from the message.

In one example, the first communication path is a radio frequency wireless communication path and the second communication path is one or more of a wired communication path, an audio communication path, an infrared optical communication path, an ultraviolet optical communication path, a visible light optical communication path, a communication path that communicates using vibrations, or a thermal communication path.

In one embodiment, a method includes determining a communication loss between a first vehicle and one or more of a second vehicle or a monitoring device in a vehicle system that also includes the first vehicle, determining an operational restriction on movement of the vehicle system based on the communication loss that is determined, determining a transitional plan that designates operational settings of the vehicle system based on the operational restriction that is determined, and automatically changing the movement of the vehicle system according to the operational settings designated by the transitional plan to reduce the movement of the vehicle system to or below the operational restriction determined by the controller responsive to the communication loss being detected.

In one example, the method also includes determining a re-establishment of communication between the first vehicle and the one or more of the second vehicle or the monitoring device, and determining a return plan that designates different operational settings of the vehicle system to increase the movement of the vehicle system above the operational restriction.

In one example, the operational restriction is a reduced speed limit that is slower than a previously designated speed limit of a route.

As described herein, a controller of a vehicle control system can detect issues with communication between a first vehicle and another vehicle, between the first vehicle and a monitoring device, or the like. These communication issues that are detected can include a loss in communication and/or a decrease in communication quality. Responsive to detecting a communication issue, the controller can operationally restrict movement of one or more vehicles in a vehicle system that includes the first vehicle and optionally one or more additional vehicles. This operational restriction can be implemented by the controller obtaining (from another location, such as an onboard memory, an off-board memory, or an off-board location) or generating the transitional plan described herein. The transitional plan can designate operational settings of one or more of the vehicles based on a location of the vehicle(s).

The communication quality can be quantified as a communication data rate, or the speed at which bits or bytes of data are communicated from one device to another device. The communication data rate may decrease below a threshold data rate responsive to one or more issues interfering with communication between the devices. Optionally, the communication quality can be quantified as a communication latency or lag, or a temporal delay between the transmission of data from one communication device and the successful receipt of the data at another communication device. Increases in communication latency can indicate decreasing communication quality.

The threshold quality to which the communication quality is compared to determine whether to implement a transitional plan can vary. For example, the controller can change the threshold quality based on a speed of one or more of the vehicles. The threshold quality can increase (e.g., meaning that higher communication qualities are required to avoid implementing a transitional plan) for vehicles moving at faster speeds. This can ensure that higher communication speeds are available for communicating between or among the faster moving vehicles to help avoid collisions. For example, the threshold quality can increase such that the time needed for vehicles to communicate with each other or the monitoring device can be shorter than a reaction or stopping time needed for the vehicle to detect a collision and implement responsive action(s).

The movement of the vehicle(s) can then be selectively changed via the transitional plan. For example, the controller can send control signals to the vehicle or vehicle(s) whose movement is to be modified by the transitional plan. Optionally, the transitional plan can be communicated from the controller to the vehicle or vehicle(s) whose movement is to be modified by the transitional plan, and the vehicle or vehicle(s) can use the transitional plan to restrict how the vehicle or vehicle(s) move. The movement can be selectively changed in that the controller can select which of the vehicles is to be impacted by the transitional plan. For example, the controller may communicate control signals or the transitional plan to a first vehicle to change how the first vehicle moves, but not to a second vehicle to change how the second vehicle moves.

The controller may selectively change the movement of a vehicle by restricting the movement of the vehicle experiencing or involving the communication loss. For example, first, second, and third vehicles can be communicating with each other to coordinate the movements of these vehicles with each other. The controller can detect a communication issue (e.g., loss or decrease in quality) between the first vehicle and the second vehicle, but not between the second vehicle and the third vehicle. The controller can selectively change the movement of the first vehicle by obtaining or generating the transitional plan, but allow the second and third vehicles to continue moving without change (dictated by the transitional plan).

Optionally, the transitional plan may restrict the movement of the vehicle experiencing the communication issue, as well as vehicles that are proximate to this vehicle. For example, in a vehicle system having many vehicles traveling together, the transitional plan may restrict movements of the vehicle experiencing the communication issue and movements of the vehicles within a designated distance (e.g., thirty meters, a kilometer, etc.) of the vehicle experiencing the communication issue.

In one example, the movement of a vehicle can be changed by the transitional plan that directs slowing of movement of the vehicle. For example, the transitional plan may direct that the vehicle slow to a designated speed, may direct that the vehicle reduce speed by a designated amount (e.g., by 50% of a current speed or a speed limit of a route), or may implement an upper speed limit on the vehicle while allowing the vehicle to move at any speed that is no faster than the upper speed limit (which can be slower than a speed limit of the route). In another example, the movement of a vehicle can be changed by a transitional plan stopping movement of the vehicle.

Figure 12:
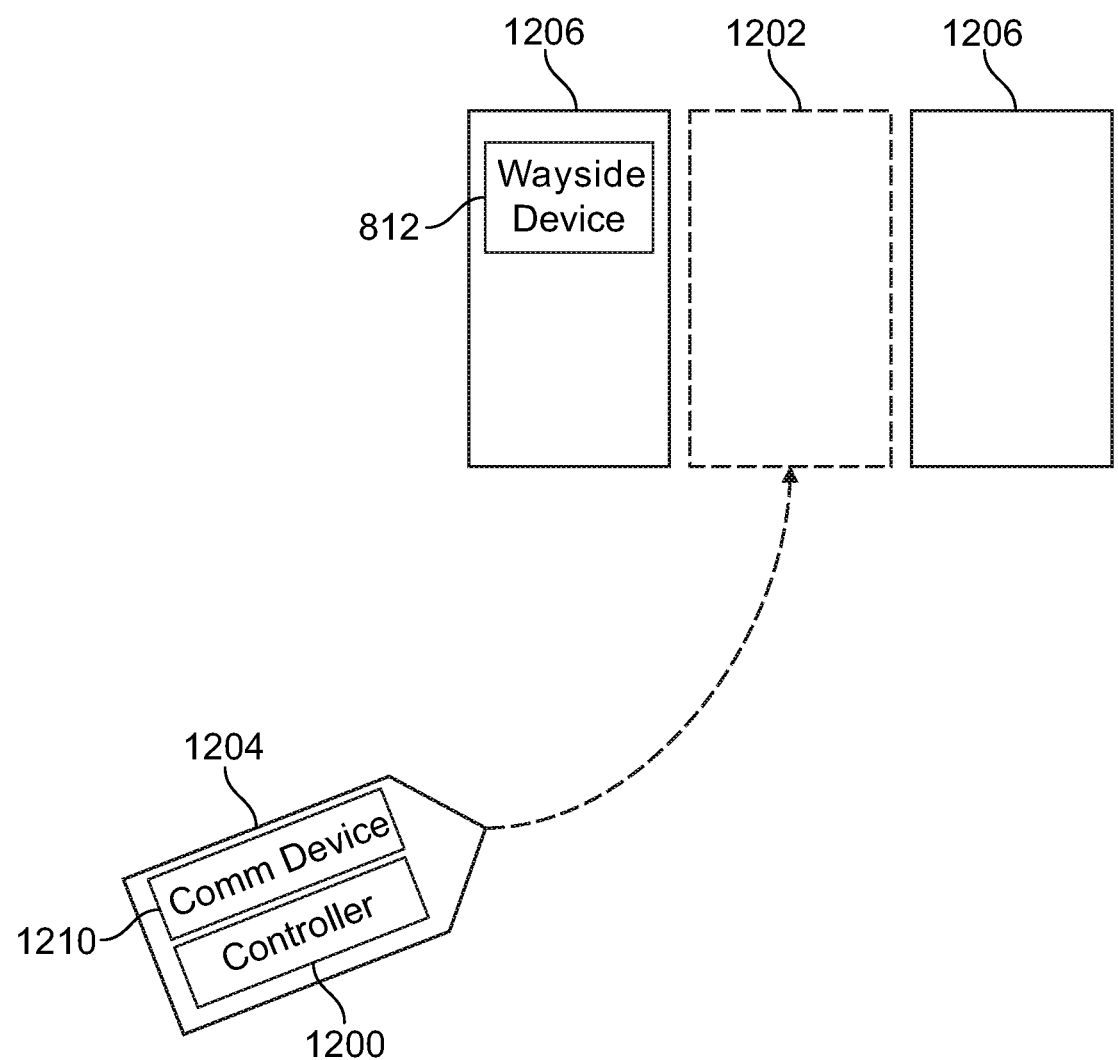
FIG. 12 illustrates one example of the vehicle control system controlling movement of a marine vessel.

FIG. 12 illustrates one example of the vehicle control system controlling movement of a marine vessel 1204. The marine vessel represents one or more of the vehicles and includes a controller 1200 that represents one or more of the controllers or control units described herein. The marine vessel also includes a communication device 1210, which can represent one or more of the communication devices described herein.

The marine vessel may be moving toward or away from designated location 1202, such a berth at a dock 1206. The monitoring device described above may be located at or near the dock. The monitoring device 812 can represent hardware circuitry that includes and/or is connected with one or more processors that communicate or monitor a communication path with the controller or control unit onboard the marine vessel. For example, the monitoring device can include transceiving hardware (e.g., antenna, modem, etc.) and processor(s) that monitor whether the transceiving hardware is able to send and/or receive wireless signals with the communication device of the marine vessel, and optionally that monitor the quality of communication with the marine vessel. The monitoring device and controller can repeatedly communicate (e.g., send and/or receive) wireless messages with each other via the communication device, or at least attempt to communicate with each other, as the marine vessel approaches and/or leaves the designated location.

If the controller detects a communication loss with the monitoring device or a decrease in communication quality below a threshold, then the controller can change the movement of the marine vessel by slowing or stopping movement of the marine vessel as a transitional plan of the marine vessel. For example, the controller can implement a transitional plan that directs the marine vessel to slow or stop movement as the marine vessel approaches the dock in response to detecting a communication loss or decrease in communication quality. The controller may then control the marine vessel to remain away from the designated location until communication is re-established or the communication quality is increased (e.g., to a threshold), or to continue toward and enter into the designated location at the slower speed (than the marine vessel previously was moving or would otherwise enter the berth).

Alternatively, the marine vessel shown in FIG. 12 may represent a truck and the designated location can be a space at a loading dock of a building, warehouse, or other facility. For example, the truck may be leaving or approaching (e.g., backing into) the loading dock, and the controller onboard the truck can check communication between the controller and the monitoring device at the loading dock. If the controller detects a loss in communication (or, optionally, detects a decrease in communication quality), then the controller may obtain or create a transitional plan that causes the truck to slow or stop movement. This can increase safety in that the truck is prevented from traveling too fast toward or away from the loading dock.

Some vehicle systems include sensors, cameras, radar, or LiDAR systems to detect objects to stop movement of the vehicle systems to prevent collisions. But, these vehicles can incorrectly identify an imminent collision with an object and incorrectly apply the brake of a vehicle system when no brake application is needed. For example, the sensors, cameras, radar systems, or LiDAR systems can require calibration, especially after repair or maintenance of the vehicle system in locations that modify or impact the accuracy of the sensors, cameras, or the like. The labor needed for this calibration includes the cost of maintaining these vehicle systems. Additionally, if the calibration is not performed or is performed incorrectly, then the sensors, camera, or the like, can incorrectly determine that the vehicle system is approaching an object and prematurely or incorrectly direct the application of brakes. In contrast, the controller implementing the transitional plan (to slow or stop a vehicle system) in response to a communication loss may not suffer from these drawbacks. For example, the controller may implement the transitional plan in response to identifying a communication loss, which may not require any calibration of a sensor, camera, or the like, to detect.

Figure 13:
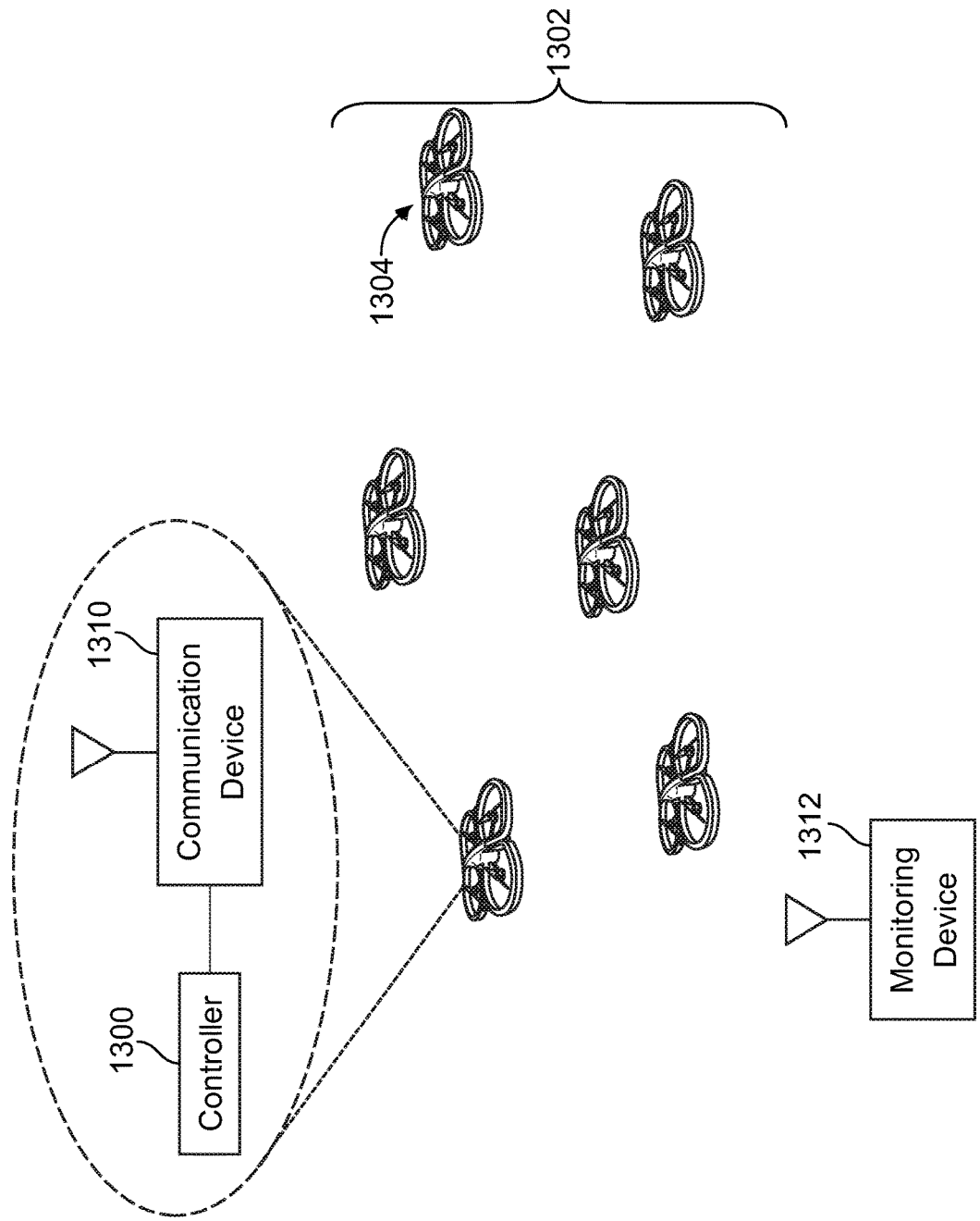
FIG. 13 illustrates another example of the vehicle control system controlling movement of several aerial vehicles.

FIG. 13 illustrates another example of the vehicle control system controlling movement of several aerial vehicles 1304, such as UAVs. In the illustrated example, each of the aerial vehicles can include a controller 1300 and a communication device 1310. This controller can represent one or more of the controllers or control units described herein, and can control the movement of the aerial vehicle in which the controller is disposed. The communication device is coupled with the controller can represent one or more of the communication devices described herein. This communication device can communicate with a monitoring device 1312 that is off-board the aerial vehicles. The monitoring device can represent one or more of the monitoring devices described herein.

The aerial vehicles may be flying in a swarm 1302. That is, the aerial vehicles may be flying together as a group. The aerial vehicles may include sensors (e.g., cameras, temperature sensors, infrared sensors, etc.) and the aerial vehicles may fly together in a group so that the sensors onboard different aerial vehicles may sense different areas or locations with the swarm of aerial vehicles moving together. The monitoring device may communicate with the aerial vehicles via the communication device to coordinate the movements of the aerial vehicles and, thereby, control movement of the swarm. Alternatively, the aerial vehicles may not be moving together as a group in the swarm, or only a single aerial vehicle may be communicating with the monitoring device. The monitoring device can operate to control movements of the aerial vehicles, or can communicate with the aerial vehicles without controlling the movements of the aerial vehicles.

The controller of one or more of the aerial vehicles may determine when there is a loss in communication with the monitoring device or when the quality in communication with the monitoring device decreases below a threshold quality. Optionally, the controller of one or more aerial vehicles can determine when communication with one or more other aerial vehicles is lost or drops in quality. The controller can obtain or create a transitional plan in response to detecting this communication loss or drop in quality. The transitional plan can direct the aerial vehicle to change movement. For example, the controller can implement the transitional plan to cause the aerial vehicle to decrease altitude and fly to a lower, designated altitude. This lower altitude can be an altitude that is sufficiently low to prevent significant damage or destruction of the aerial vehicle should the aerial vehicle lose the ability to continue hovering or flying. This lower altitude can be an altitude that is sufficiently high to prevent the aerial vehicle from colliding with other objects, such as other vehicles, persons, etc.

Alternatively, the controller and communication device may be off-board the aerial vehicles and the monitoring device may be one or more of the aerial vehicles (e.g., a monitoring device may be onboard each of the aerial vehicles). The controller can obtain and implement the transitional plan responsive to a decrease communication quality with one or more of the aerial vehicles. For example, the controller can direct the aerial vehicles with which the communication quality has decreased below a threshold quality to reduce altitude to the designated safe altitude.

Optionally, the controller can repeatedly test the ability of the controller to communicate with one or more of the aerial vehicles. If the controller is unable to successfully communicate with an aerial vehicle, the controller may identify a communication loss with that aerial vehicle. The controller may then attempt to communicate instructions to the aerial vehicle (repeatedly, if needed) to instruct the aerial vehicle to move to the safe altitude as implementation of the transitional plan.

In one embodiment, the transitional plan is implemented to only change movement of one or more, but not all, of the swarm. For example, only those aerial vehicles that lose communication or that have a decrease in the communication quality may have the transitional plan implemented (e.g., selectively implemented with only those vehicles). As another example, the aerial vehicles that are proximate to the aerial vehicle experiencing the communication issue (e.g., loss or quality drop) also may have the transitional plan implemented to restrict or change movement of those proximate aerial vehicles. The remaining aerial vehicle or vehicles in the swarm may continue flying without the transitional plan being implemented with respect to that or those vehicles.

Optionally, the transitional plan may be implemented for the entire swarm of aerial vehicles. Responsive to detecting a communication loss or drop in the quality of communication with one or more (but not all) aerial vehicles in the swarm, the transitional play may be implemented to restrict the movement of all aerial vehicles in the swarm.

In another embodiment, the transitional plan may be implemented to restrict movements of automobiles based on losses in communication or decreases in communication quality. For example, the controllers and communication devices described herein can be disposed onboard automobiles that communicate with the monitoring device off-board the automobiles and/or that communicate with each other. The automobiles may be controlled by operators located onboard the automobiles or may be automatically or autonomously controlled. Responsive to the controller losing communication with an automobile (or experiencing a decrease in communication quality), the controller onboard the automobile may obtain or create a transitional plan and implement the transitional plan to automatically slow or stop movement of the automobile. This can occur by automatically decreasing a throttle setting of the automobile, automatically engaging brakes of the automobile, automatically shutting down the engine of the automobile, or the like. As described above, the transitional plan may be implemented to change the movement of the automobile with which communication loss was detected, the automobile with which communication was lost and other vehicle(s) within a designated distance of that automobile (e.g., proximate vehicles), etc.

The transitional plans described herein may be implemented following detection of the communication issue, and may continue to be implemented until the vehicle experiencing the communication issue is resolved. As described above, the controller can obtain or create a return plan to return movement of a vehicle from the restricted movement resulting by implementation of the transitional plan to the state of movement of the vehicle prior to implementing the transitional plan. For example, movement of the vehicle may be slowed or stopped until communication is re-established with the vehicle or until the quality of the communication increases above the quality threshold. The speed and/or altitude of the vehicle may then be increased (e.g., automatically), the engine of the vehicle may be automatically re-started, the brakes of the vehicle may be automatically disengaged, etc.

The return plan may be created to achieve one or more goals or objectives. For example, the controller may have a variety of options for procedures for returning movement of a vehicle from the restricted state caused by the transitional plan. The controller can select or create the return plan that is calculated or estimated to result in less fuel being consumed by the vehicle, less emissions generated by the vehicle, and/or less wear-and-tear on the vehicle. The amounts of fuel, emissions, or wear-and-tear for different return plans may be measured from prior trips of vehicles, based on default values, calculated from models, etc. The controller can then create or select a return plan based on these measured, default, or calculated amounts such that the fuel consumed by, emissions generated by, or wear-and-tear experienced by the vehicle is less than if another return plan was implemented.

The return plan may be created or selected based on other ambient or route factors, such as weather conditions, route grades, and/or route curvatures. The controller can create a return plan based on the weather condition of where the vehicle is located. If the weather conditions indicate adverse conditions (e.g., a strong headwind, precipitation, ice, dense fog, storms, etc.), then the controller can create the return plan to avoid the adverse weather conditions, to avoid dangerous conditions, etc. For example, if visibility is low, there are strong headwinds, or other adverse weather conditions, the return plan may cause the vehicle to accelerate at a slower rate than if the visibility was better, the headwinds were weaker, or the weather conditions were less adverse. If the vehicle is approaching a steeper uphill grade or a curved portion of the route, then the return plan may direct the vehicle to accelerate more slowly than if the vehicle were approaching a downhill grade, flat grade, or straighter portion of the route.

In one embodiment, a vehicle control system includes a controller configured to detect a communication loss between a first vehicle and one or more of a second vehicle or a monitoring device in a vehicle system that also includes the first vehicle. The controller is configured to operationally restrict movement of one or more vehicles in the vehicle system based on the communication loss that is determined. The controller also is configured to obtain or generate a transitional plan that designates operational settings for one or more of the first vehicle or the second vehicle based at least in part on a location of one or more of the first vehicle or the second vehicle. The controller also is configured to selectively change the movement of the one or more of the first vehicle or the second vehicle via the transitional plan to reduce a speed of the one or more of the first vehicle or the second vehicle responsive to the communication loss being detected.

Optionally, the controller is configured to selectively change the movement of the first vehicle or the second vehicle by slowing or stopping the movement of the first vehicle or the second vehicle having the communication loss.

Optionally, the controller is configured to selectively change the movement of the first vehicle or the second vehicle and one or more proximate vehicles by slowing or stopping the movement of the first vehicle or the second vehicle having the communication loss and by slowing or stopping the movement of the one or more proximate vehicles.

Optionally, the monitoring device is a wayside device in communication with the vehicle system.

Optionally, the first vehicle is a marine vessel and the monitoring device is a wayside device located at a dock or a berth. The controller can be configured to selectively change the movement of the marine vessel by slowing or stopping movement of the marine vessel as the marine vessel approaches or departs from the dock or the berth via the transitional plan responsive to the controller detecting the communication loss between the marine vessel and the wayside device.

Optionally, the first vehicle is a truck and the monitoring device is a wayside device located at a loading dock. The controller can be configured to selectively change the movement of the truck by slowing or stopping movement of the truck as the truck approaches or departs from the loading dock via the transitional plan responsive to the controller detecting the communication loss between the truck and the wayside device.

Optionally, the first vehicle is a first unmanned aerial vehicle (UAV) and the second vehicle is a second UAV. The controller can be configured to selectively change the movement of at least one of the first UAV or the second UAV by decreasing altitude of the at least one of the first UAV or the second UAV responsive to the controller detecting the communication loss.

Optionally, the first vehicle is a first unmanned aerial vehicle (UAV) flying in a swarm of UAVs. The controller can be configured to selectively change the movement of the swarm of UAVs by one or more of slowing flight of the UAVs in the swarm or decreasing altitudes of the UAVs in the swarm responsive to the controller detecting the communication loss.

Optionally, the first vehicle is a first unmanned aerial vehicle (UAV) flying in a swarm of UAVs. The controller can be configured to selectively change the movement of the first UAV by removing the first UAV from the swarm of UAVs responsive to the controller detecting the communication loss.

Optionally, the first vehicle is a first automobile and the second vehicle is a second automobile. The controller can be configured to selectively change the movement of one or more of the first automobile or the second automobile by slowing the one or more of the first automobile or the second automobile responsive to the controller detecting the communication loss and until communication is re-established following the communication loss.

Optionally, the first vehicle is a first automobile and the second vehicle is a second automobile. The controller can be configured to selectively change the movement of one or more of the first automobile or the second automobile by stopping movement of the one or more of the first automobile or the second automobile responsive to the controller detecting the communication loss and until communication is re-established following the communication loss.

Optionally, the controller is configured to selectively change the movement of one or more of the first vehicle or the second vehicle by slowing or stopping an engine of the one or more of the first vehicle or the second vehicle responsive to detecting the communication loss.

In one embodiment, a vehicle control system includes a controller configured to determine a communication loss between a first vehicle and one or more of: a monitoring device and/or a second vehicle in a vehicle system that also includes the first vehicle. The controller is configured to implement an operational restriction on movement of one or more vehicles in the vehicle system based on the communication loss that is determined. The controller also is configured to obtain or generate a transitional plan that designates operational settings for one or more of the first vehicle or the second vehicle based at least in part on a location of the one or more of the first vehicle or the second vehicle. The controller also is configured to determine re-establishment of communication between the first vehicle and the one or more of the monitoring device or the second vehicle and, responsive to determining that communication is re-established, to obtain or generate a return plan that designates different operational settings of the one or more of the first vehicle or the second vehicle to remove the operational restriction of the one or more of the first vehicle or the second vehicle.

Optionally, the controller is configured to direct an engine of the one or more of the first vehicle or the second vehicle to start up responsive to determining that communication is re-established.

Optionally, the controller is configured to direct the one or more of the first vehicle or the second vehicle to speed up responsive to determining that communication is re-established.

Optionally, the controller is configured to obtain or generate the return plan based at least in part on reducing one or more of fuel consumed, emission generated, or wear and tear on equipment of the one or more of the first vehicle or the second vehicle.

Optionally, the controller is configured to obtain or generate the return plan to direct the one or more of the first vehicle or the second vehicle to control a brake of the first vehicle or the second vehicle.

Optionally, the controller is configured to obtain or generate the return plan based at least in part on one or more of a weather condition, a grade in a route, or a curve in the route.

In one embodiment, a vehicle control system includes a controller configured to determine a decrease in communication quality between a first vehicle and one or more of: a monitoring device and/or a second vehicle in a vehicle system that also includes the first vehicle. The controller is configured to implement an operational restriction on movement of one or more vehicles in the vehicle system based on the communication quality being less than a threshold quality. The controller is configured to obtain or generate a transitional plan that designates operational settings for one or more of the first vehicle or the second vehicle based at least in part on a location of the one or more of the first vehicle or the second vehicle. The controller also is configured to determine an increase in the communication quality above the threshold quality and, responsive to the communication quality increasing to or above the threshold quality, the controller is configured to obtain or generate a return plan that designates different operational settings of the one or more of the first vehicle or the second vehicle to remove the operational restriction of the one or more of the first vehicle or the second vehicle.

Optionally, the communication quality is one or more of a communication data rate, a communication latency, a lag in communication, or a change in one or more of the communication data rate, the communication latency, or the lag in communication in a first data feed relative to a different, second data feed.

Optionally, the threshold quality is based at least in part on a speed of the one or more of the first vehicle or the second vehicle and is based at least in part on the communication quality to prevent the one or more of the first vehicle or the second vehicle from moving into a potential collision due to communication with the one or more of the first vehicle or the second vehicle being slower than a reaction speed of the one or more of the first vehicle or the second vehicle.

The foregoing description of certain embodiments of the inventive subject matter will be better understood when read in conjunction with the appended drawings. The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Reference is made in detail to various embodiments of the inventive subject matter, examples of which are illustrated in the accompanying drawings. The same reference numerals used throughout the drawings may refer to the same or like parts. As disclosed below, multiple version of a same element may be disclosed. Likewise, with respect to other elements, a singular version may be is disclosed. Neither multiple versions disclosed nor a singular version disclosed shall be considered limiting. Specifically, although multiple versions are disclosed, a singular version may be utilized. Likewise, where a singular version is disclosed, multiple versions may be utilized.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system, comprising:
   a controller configured to detect a change in communication quality between a first vehicle and one or more of a second vehicle or a monitoring device in a vehicle system that also includes the first vehicle, the controller configured to operationally restrict movement of one or more vehicles in the vehicle system based on a reduction in communication quality being detected, and wherein the controller also is configured to obtain or generate a transitional plan that designates operational settings for one or more of the first vehicle or the second vehicle based at least in part on a location of one or more of the first vehicle or the second vehicle, and wherein the controller also is configured to selectively change the movement of the one or more of the first vehicle or the second vehicle via the transitional plan to reduce a speed of the one or more of the first vehicle or the second vehicle responsive to the reduction in communication quality being detected.

2. The vehicle control system of claim 1, wherein the controller is configured to selectively change the movement of the first vehicle or the second vehicle by slowing or stopping the movement of the first vehicle or the second vehicle having the change in communication quality.

3. The vehicle control system of claim 1, wherein the controller is configured to selectively change the movement of the first vehicle or the second vehicle and one or more proximate vehicles by slowing or stopping the movement of the first vehicle or the second vehicle having the change in communication quality and by slowing or stopping the movement of the one or more proximate vehicles.

4. The vehicle control system of claim 1, wherein the monitoring device is a wayside device in communication with the vehicle system.

5. The vehicle control system of claim 1, wherein the first vehicle is a marine vessel and the monitoring device is a wayside device located at a dock or a berth, and wherein the controller is configured to selectively change the movement of the marine vessel by slowing or stopping movement of the marine vessel as the marine vessel approaches or departs from the dock or the berth via the transitional plan responsive to the controller detecting the change in communication quality between the marine vessel and the wayside device.

6. The vehicle control system of claim 1, wherein the first vehicle is a truck and the monitoring device is a wayside device located at a loading dock, wherein the controller is configured to selectively change the movement of the truck by slowing or stopping movement of the truck as the truck approaches or departs from the loading dock via the transitional plan responsive to the controller detecting the change in communication quality between the truck and the wayside device.

7. The vehicle control system of claim 1, wherein the first vehicle is a first unmanned aerial vehicle (UAV) and the second vehicle is a second UAV, wherein the controller is configured to selectively change the movement of at least one of the first UAV or the second UAV by decreasing altitude of the at least one of the first UAV or the second UAV responsive to the controller detecting the change in communication quality.

8. The vehicle control system of claim 1, wherein the first vehicle is a first unmanned aerial vehicle (UAV) flying in a swarm of UAVs, wherein the controller is configured to selectively change the movement of the swarm of UAVs by one or more of slowing flight of the UAVs in the swarm or decreasing altitudes of the UAVs in the swarm responsive to the controller detecting the change in communication quality.

9. The vehicle control system of claim 1, wherein the first vehicle is a first unmanned aerial vehicle (UAV) flying in a swarm of UAVs, wherein the controller is configured to selectively change the movement of the first UAV by removing the first UAV from the swarm of UAVs responsive to the controller detecting the change in communication quality.

10. The vehicle control system of claim 1, wherein the first vehicle is a first automobile and the second vehicle is a second automobile, wherein the controller is configured to selectively change the movement of one or more of the first automobile or the second automobile by slowing the one or more of the first automobile or the second automobile responsive to the controller detecting the change in communication quality and until communication is re-established following the change in communication quality.

11. The vehicle control system of claim 1, wherein the first vehicle is a first automobile and the second vehicle is a second automobile, wherein the controller is configured to selectively change the movement of one or more of the first automobile or the second automobile by stopping movement of the one or more of the first automobile or the second automobile responsive to the controller detecting the change in communication quality and until communication is re-established following the change in communication quality.

12. The vehicle control system of claim 1, wherein the controller is configured to selectively change the movement of one or more of the first vehicle or the second vehicle by slowing or stopping an engine of the one or more of the first vehicle or the second vehicle responsive to detecting the change in communication quality.

13. A vehicle control system, comprising:
a controller configured to determine a communication loss between a first vehicle and one or more of:
a monitoring device or
a second vehicle in a vehicle system that also includes the first vehicle,
wherein the controller is configured to implement an operational restriction on movement of one or more vehicles in the vehicle system based on the communication loss that is determined,
wherein the controller also is configured to obtain or generate a transitional plan that designates operational settings for one or more of the first vehicle or the second vehicle based at least in part on a location of the one or more of the first vehicle or the second vehicle, and
wherein the controller also is configured to determine re-establishment of communication between the first vehicle and the one or more of the monitoring device or the second vehicle and, responsive to determining that communication is re-established, to obtain or generate a return plan that designates different operational settings of the one or more of the first vehicle or the second vehicle to remove the operational restriction of the one or more of the first vehicle or the second vehicle.

14. The vehicle control system of claim 13, wherein the controller is configured to direct an engine of the one or more of the first vehicle or the second vehicle to start up responsive to determining that communication is re-established.

15. The vehicle control system of claim 13, wherein the controller is configured to direct the one or more of the first vehicle or the second vehicle to speed up responsive to determining that communication is re-established.

16. The vehicle control system of claim 13, wherein the controller is configured to obtain or generate the return plan based at least in part on reducing one or more of fuel consumed, emission generated, or wear and tear on equipment of the one or more of the first vehicle or the second vehicle.

17. The vehicle control system of claim 13, wherein the controller is configured to obtain or generate the return plan to direct the one or more of the first vehicle or the second vehicle to control a brake of the first vehicle or the second vehicle.

18. The vehicle control system of claim 13, wherein the controller is configured to obtain or generate the return plan based at least in part on one or more of a weather condition, a grade in a route, or a curve in the route.

19. A vehicle control system, comprising:
a controller configured to determine a decrease in communication quality between a first vehicle and one or more of:
a monitoring device or
a second vehicle in a vehicle system that also includes the first vehicle,
wherein the controller is configured to implement an operational restriction on movement of one or more vehicles in the vehicle system based on the communication quality being less than a threshold quality,
wherein the controller is configured to obtain or generate a transitional plan that designates operational settings for one or more of the first vehicle or the second vehicle based at least in part on a location of the one or more of the first vehicle or the second vehicle, and
wherein the controller also is configured to determine an increase in the communication quality above the threshold quality and, responsive to the communication quality increasing to or above the threshold quality, the controller is configured to obtain or generate a return plan that designates different operational settings of the one or more of the first vehicle or the second vehicle to remove the operational restriction of the one or more of the first vehicle or the second vehicle.

20. The vehicle control system of claim 19, wherein the communication quality is one or more of a communication data rate, a communication latency, a lag in communication, or a change in one or more of the communication data rate, the communication latency, or the lag in communication in a first data feed relative to a different, second data feed.

21. The vehicle control system of claim 19, wherein the threshold quality is based at least in part on a speed of the one or more of the first vehicle or the second vehicle and is based at least in part on the communication quality to prevent the one or more of the first vehicle or the second vehicle from moving into a potential collision due to communication with the one or more of the first vehicle or the second vehicle being slower than a reaction speed of the one or more of the first vehicle or the second vehicle.

* * * * *